United States Patent
Nozaki et al.

(10) Patent No.: US 11,637,964 B2
(45) Date of Patent: Apr. 25, 2023

(54) IMAGE PROCESSING APPARATUS, IMAGE DISPLAY SYSTEM, IMAGE PROCESSING METHOD HAVING A TIME DITHERING PROCESS

(71) Applicant: CANON KABUSHIKI KAISHA, Tokyo (JP)

(72) Inventors: Ryohei Nozaki, Kanagawa (JP); Nana Ohyama, Kanagawa (JP); Koichi Gunji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/567,265

(22) Filed: Jan. 3, 2022

(65) Prior Publication Data
US 2022/0224821 A1 Jul. 14, 2022

(30) Foreign Application Priority Data
Jan. 14, 2021 (JP) .............................. JP2021-004500

(51) Int. Cl.
*H04N 5/235* (2006.01)
*H04N 5/232* (2006.01)

(52) U.S. Cl.
CPC ......... *H04N 5/2355* (2013.01); *H04N 5/2351* (2013.01); *H04N 5/23229* (2013.01)

(58) Field of Classification Search
CPC . H04N 5/2355; H04N 5/23229; H04N 5/2351
See application file for complete search history.

(56) References Cited

U.S. PATENT DOCUMENTS

| | | | | |
|---|---|---|---|---|
| 7,623,270 B2* | 11/2009 | Gardella | ................ | H04N 19/90 358/535 |
| 8,860,750 B2* | 10/2014 | Tripathi | ............... | G09G 3/2066 345/581 |
| 11,445,211 B1* | 9/2022 | Waggoner | ............ | H04N 19/172 |
| 2006/0044325 A1* | 3/2006 | Thebault | .............. | G09G 3/2055 345/613 |
| 2017/0148371 A1* | 5/2017 | Qian | ........................ | G06T 1/20 |

FOREIGN PATENT DOCUMENTS

| | | |
|---|---|---|
| JP | H10-261080 A | 9/1998 |
| JP | 2020-052097 A | 4/2020 |

* cited by examiner

*Primary Examiner* — Luong T Nguyen
(74) *Attorney, Agent, or Firm* — Carter, DeLuca & Farrell LLP

(57) ABSTRACT

An image processing apparatus for performing processing that rounds down C bits from an A-bit image, and that causes a B=(A−C) bit image resulting from the rounding down processing to be displayed comprises a time dithering unit configured to express a pixel value that is an intermediate value of one step in the (A−C) bits in the A-bit image by selectively outputting in each frame across N frames a value where the intermediate value was rounded down and a value where the intermediate value was rounded up, and to artificially express the A-bit image with a dither pattern where the N frames is a minimum unit, wherein the time dithering unit sets the value of N so that M/N is 25 or more.

17 Claims, 15 Drawing Sheets

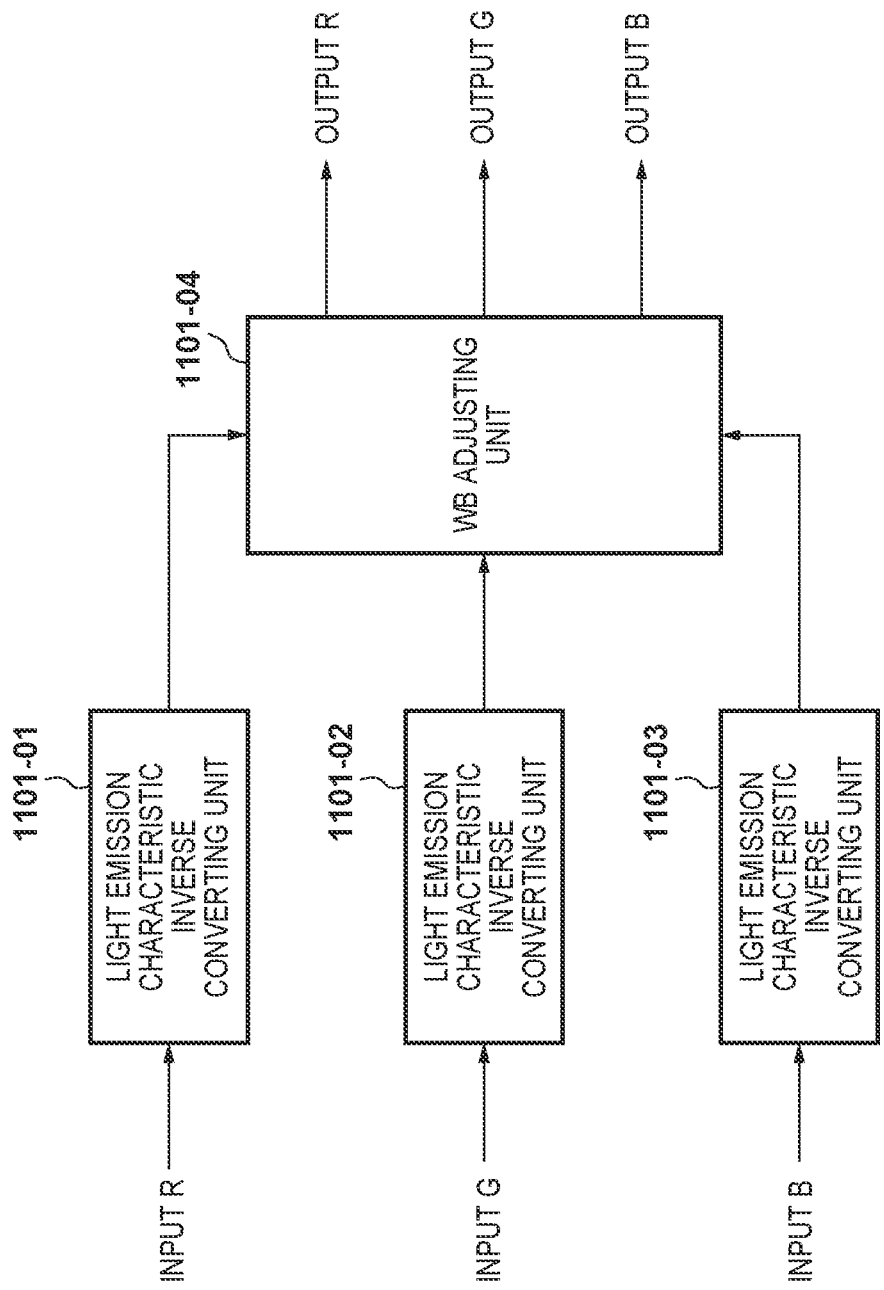

FIG. 13A  WHEN N=2

| DISPLAY FRAME RATE M[Hz] | 15 | 30 | 60 | 120 | 240 |
|---|---|---|---|---|---|
| NUMBER OF FRAMES N OF TIME DITHERING | 2 | 2 | 2 | 2 | 2 |
| TIME DITHERING FREQUENCY M/N[Hz] | 7.5 | 15 | 30 | 60 | 120 |
| TIME DITHERING PROCESS | NO | NO | YES | YES | YES |
| SPATIAL DITHERING PROCESS | YES | YES | NO OR YES | NO OR YES | NO OR YES |

FIG. 13B  WHEN N CAN CHANGE

| DISPLAY FRAME RATE M[Hz] | 15 | 30 | 60 | 120 | 240 |
|---|---|---|---|---|---|
| NUMBER OF FRAMES N OF TIME DITHERING | 2 | 2 | 2 | 4 | 8 |
| TIME DITHERING FREQUENCY M/N[Hz] | 7.5 | 15 | 30 | 30 | 30 |
| TIME DITHERING PROCESS | NO | NO | YES | YES | YES |
| SPATIAL DITHERING PROCESS | YES | YES | NO OR YES | NO OR YES | NO OR YES |

FIG. 13C  WHEN MOVING IMAGE

| DISPLAY FRAME RATE M[Hz] | 15 | 30 | 60 | 120 | 240 |
|---|---|---|---|---|---|
| NUMBER OF FRAMES N OF TIME DITHERING | 2 | 2 | 2 | 2 | 2or4 |
| TIME DITHERING FREQUENCY M/N[Hz] | 7.5 | 15 | 30 | 60 | 120or60 |
| TIME DITHERING PROCESS | NO | NO | NO | YES | YES |
| SPATIAL DITHERING PROCESS | YES | YES | YES | YES | YES |

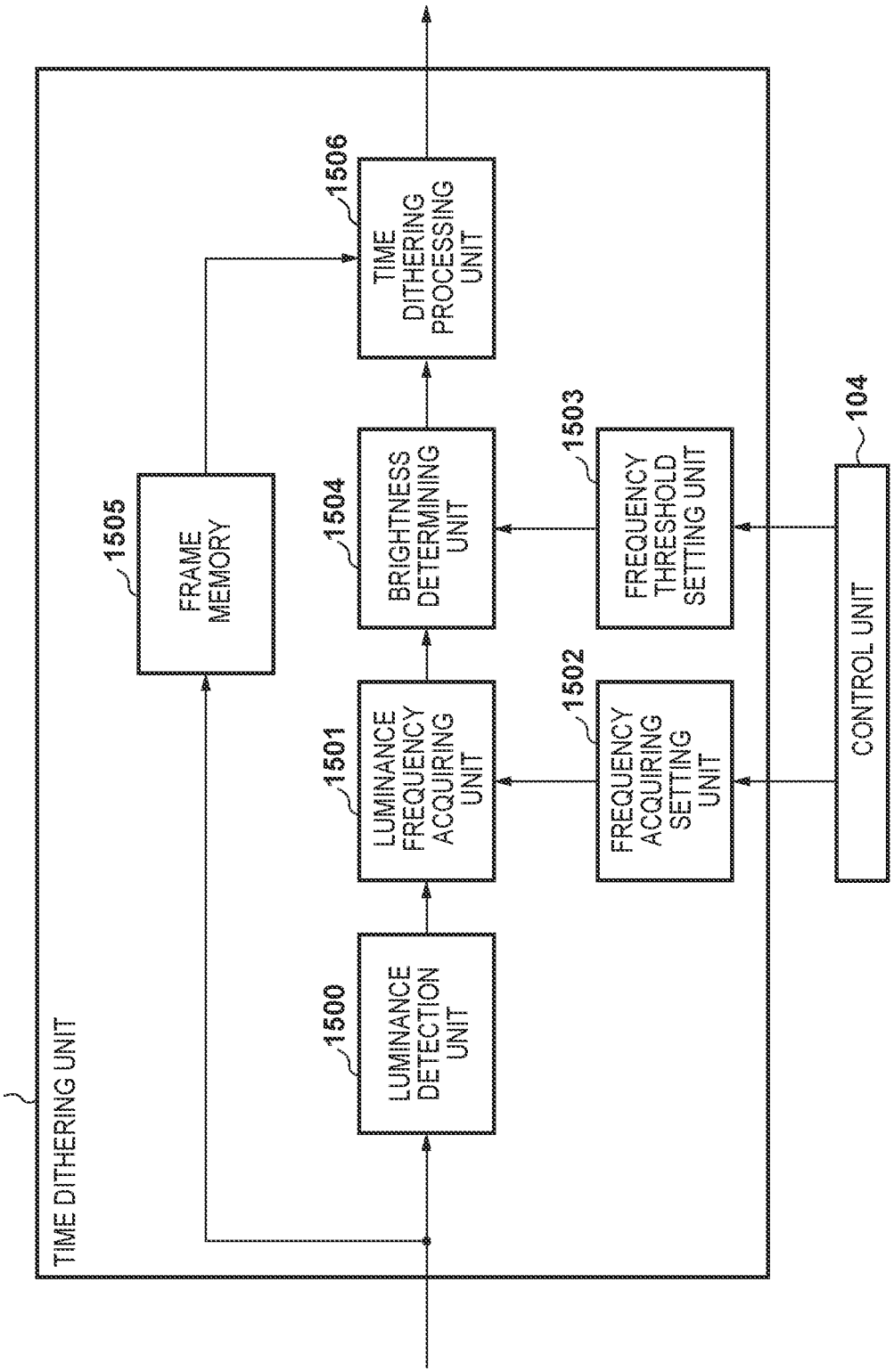

IMAGE PROCESSING APPARATUS, IMAGE DISPLAY SYSTEM, IMAGE PROCESSING METHOD HAVING A TIME DITHERING PROCESS

BACKGROUND OF THE INVENTION

Field of the Invention

The present invention relates to a technique for performing dither processing on image data.

Description of the Related Art

Conventionally, Standard Dynamic Range (hereinafter referred to as SDR) has been used as the dynamic range for luminance in video display devices such as TVs, displays, and smartphones. In recent years, however, there has been an increasing number of displays that can support High Dynamic Range which is of wider dynamic range of luminance (hereafter referred to as HDR).

SDR processing specified in the standard RECOMMENDATION ITU-R BT.709 (hereinafter referred to as ITU-BT. 709) is premised upon 8-bit quantization level processing. Meanwhile, the HDR processing specified by SMPTE STANDARD 2084 standard (hereinafter referred to as SMPTE ST 2084) is assumed to be many-bit processing of 10 bits or more.

In an image display system premised upon this many-bit processing, an input unit of a display apparatus may be less than 10 bits even though an image processing apparatus has a many-bit processing function of 10 bits or more. In this case, it is necessary to reduce the number of bits of the image when outputting the image to the display apparatus, but gradations of the image become coarse due to the reduction of the number of bits of the image, and an artificial contour may occur. A dither processing method is known as a method for solving this problem of artificial contours.

Japanese Patent Laid-Open No. 2020-52097 discloses a technique of suppressing artificial contours by performing dither processing in the time direction (hereinafter referred to as a time dithering process) and dither processing in the spatial direction (hereinafter referred to as a spatial dithering process) using a plurality of dither matrices and artificially expressing gradations.

Japanese Patent Laid-Open No. H10-261080 discloses a technique of suppressing an artificial contour by dither processing in the time direction or dither processing in the spatial direction using a random number.

However, since the time dithering process changes the luminance of the image at a high speed, this change in luminance may appear as a variance (flicker) of the screen. In particular, when a time dithering process is performed on an HDR image, flicker becomes more conspicuous than with an SDR image. In addition, when a time dithering process is performed, the required number of frames is large and the lower the frequency of the dithering (hereinafter, the dither frequency) with respect to the frame rate, the more conspicuous the flicker becomes in the image display.

In the time dithering process and the spatial dithering process in Japanese Patent Laid-Open No. 2020-52097, it may be difficult to increase the dither frequency depending on the conditions because there is a tradeoff between widening the area of the dither matrix and increasing the number of frames that are necessary.

Further, in the time dithering process in Japanese Patent Laid-Open No. H10-261080, since a random number generation unit is used and random number addition is performed in the time dithering process, it is difficult to uniquely determine the dither frequency.

SUMMARY OF THE INVENTION

The present invention has been made in view of the above-mentioned problems, and provides an image processing apparatus capable of suppressing the occurrence of flicker and artificial contours when displaying an HDR image having a larger number of bits on a display apparatus which displays a smaller number of bits.

According to a first aspect of the present invention, there is provided an image processing apparatus for performing processing that rounds down C bits (C is a positive integer) from an A-bit (A is a positive integer) image, and that causes a B=(A−C) bit image resulting from the rounding down processing to be displayed on a display device at a frame rate of M frames/second (M is a positive real number), the image processing apparatus comprising: at least one processor or circuit configured to function as: a time dithering unit configured to express a pixel value that is an intermediate value of one step in the (A−C) bits in the A-bit image by, in accordance with a ratio in the one step of the intermediate value, selectively outputting in each frame across N frames (N is a positive integer) a value where the intermediate value in the (A−C) bits was rounded down and a value where the intermediate value in the (A−C) bits was rounded up, and to artificially express the A-bit image with a dither pattern where the N frames is a minimum unit, wherein the time dithering unit sets the value of N so that M/N is 25 or more.

According to a second aspect of the present invention, there is provided an image display system, comprising: the image processing apparatus described above; a display apparatus configured to display an image; and an external data transmission line configured to transmit an image from the image processing apparatus to the display apparatus, wherein the display apparatus comprises an EOTF converting unit configured to convert an image acquired through the external data transmission line using an EOTF which has a reverse characteristic to an OETF used in an OETF converting unit that the image processing apparatus comprises.

According to a third aspect of the present invention, there is provided an image display system, comprising: the image processing apparatus described above; a display apparatus configured to display an image; and an external data transmission line configured to transmit an image from the image processing apparatus to the display apparatus, wherein the image processing apparatus comprises a light emission characteristic inverse converting unit configured to perform an inverse conversion of a light emitting characteristic based on a display configuration of the display apparatus in relation to an image acquired by an OETF converting unit, and the display apparatus comprises a light emission characteristic converting unit configured to perform a conversion of a light emitting characteristic based on a display configuration of the display apparatus in relation to an image acquired from the external data transmission line.

According to a fourth aspect of the present invention, there is provided an image processing method for performing processing that rounds down C bits (C is a positive integer) from an A-bit (A is a positive integer) image, and that causes a B=(A−C) bit image resulting from the rounding down processing to be displayed on a display device at a frame rate of M frames/second (M is a positive real number), the method comprising: performing a time dithering process that expresses a pixel value that is an intermediate value of one step in the (A−C) bits in the A-bit image by, in accordance with a ratio in the one step of the intermediate value, selectively outputting in each frame across N frames (N is a positive integer) a value where the intermediate value in the (A−C) bits was rounded down and a value where the intermediate value in the (A−C) bits was rounded up, and artificially expresses the A-bit image with a dither pattern where the N frames is a minimum unit, wherein the value of N is set in the time dithering process so that M/N is 25 or more.

Further features of the present invention will become apparent from the following description of exemplary embodiments with reference to the attached drawings.

BRIEF DESCRIPTION OF THE DRAWINGS

FIG. 12 is a detailed block diagram of a light emission characteristic inverse converting unit in the third embodiment.

FIGS. 13A to 13C are diagrams illustrating an example of the processing contents of a time dithering process and a spatial dithering process in the fourth embodiment.

FIG. 15 is a block diagram illustrating a configuration example of a time dithering unit in a sixth embodiment.

DESCRIPTION OF THE EMBODIMENTS

Figure 1:
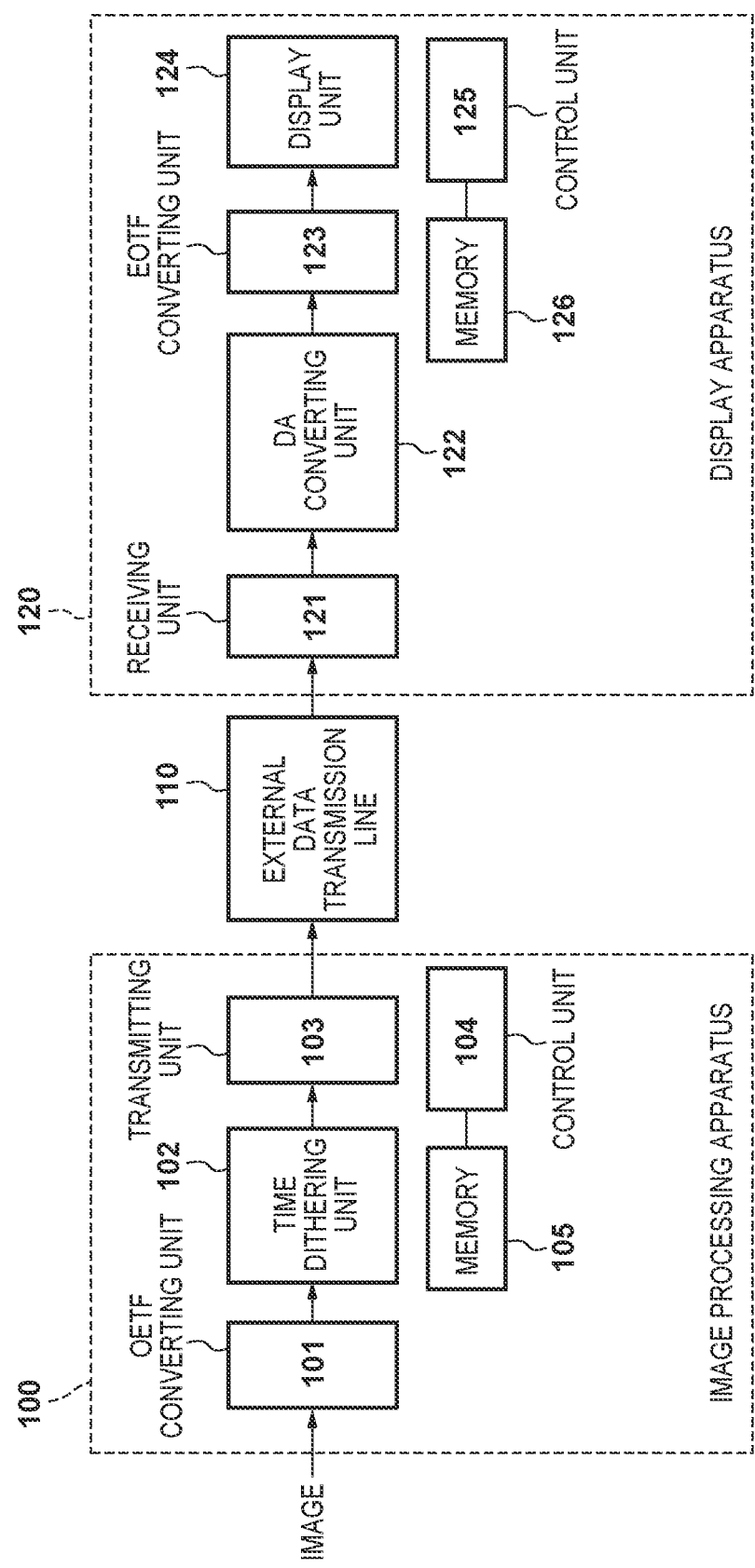
FIG. 1 is a block diagram illustrating a configuration example of an image display system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration example of an image display system including an image processing apparatus according to a first embodiment of the present invention.

In FIG. 1, the image display system of the present embodiment is configured to include an image processing apparatus 100, an external data transmission line 110, and a display apparatus 120. It is assumed that, in the image display system of the present embodiment, RGB image data is used as an input image, and a display unit to be described later is also configured by RGB pixels.

The image processing apparatus 100 includes an OETF converting unit 101, a time dithering unit 102, a transmitting unit 103, a control unit 104, and a memory 105. The OETF converting unit 101, the time dithering unit 102, and the transmitting unit 103 may be independent circuits, respectively, and may be realized by the control unit 104 executing a program stored in the memory 105.

The OETF (Optical-Electro Transfer Function) converting unit 101 converts digital image data inputted from the outside into OETF which conforms to a generalized standard such as ITU BT.709 or SMPTE ST 2084.

The time dithering unit 102 performs a time dithering process for changing the image data in accordance with the value of a predetermined bit in the acquired image data. The time dithering process is a technique for artificially increasing gradations by switching data in accordance with the value of rounded down bits. The time dithering unit 102 changes the image data in accordance with the display speed (frame rate) of the display apparatus 120 and color information of each pixel of the input image. Detailed processing will be described later.

The transmitting unit 103 transmits the image data to the receiving unit 121 of the display apparatus 120 via the external data transmission line 110.

The control unit 104 controls the operation of each component of the image processing apparatus 100 by executing a program stored in the memory 105.

The external data transmission line 110 is a data transferring path exclusively for image data, and is assumed to be LVDS (Low Voltage Differential Signaling), HDMI (registered trademark) (High-Definition Multimedia Interface), Display Port (registered trademark), SDI (Serial Digital Interface), MIPI (Mobile Industry Processor Interface), or the like. It is assumed that the external data transmission line 110 in the present embodiment has 8 bit precision. Bit precision means the substantial bit width rather than the physical bit width. For example, with 8 bits of data are packed with 2 bits of 0s on a 10 bit width transmission line, 8 bit precision is achieved.

The display apparatus 120 includes a receiving unit 121, a DA converting unit 122, an EOTF converting unit 123, a display unit 124, a control unit 125, and a memory 126. The receiving unit 121, the DA converting unit 122, and the EOTF converting unit 123 may be independent circuits, respectively, and may be realized by the control unit 125 executing a program stored in the memory 126.

The receiving unit 121 acquires image data from the image processing apparatus 100 via the external data transmission line 110. The DA (Digital Analog) converting unit 122 converts the digital image data acquired from the receiving unit 121 into an analog signal.

The EOTF (Electro-Optical Transfer Function) converting unit 123 performs an EOTF conversion on the analog image signal acquired from the DA converting unit 122. The OETF conversion and the EOTF conversion are inverse conversions (reverse characteristics). Image data converted to EOTF is displayed on the display unit 124 to be described later.

The same image data as the image data acquired by the image processing apparatus 100 is displayed on the display unit 124 by the above-described data flow.

The display unit 124 is configured by a cathode ray tube, liquid crystals, organic EL, or the like. The display unit 124 has unique light emission characteristics depending on materials and configurations. A display configuration such as a cathode ray tube is said to have light emission characteristics close to EOTF defined in ITU BT.709.

On the other hand, EOTF, which brings displaying by a display configuration to an approximation suitable to human perception, is defined by SMPTE ST 2084. The EOTF converting unit 123 represents a conversion process for converting electric input data into light emission characteristics depending on the display configuration. When displaying an image on the display unit, an EOTF conversion based on the display unit 124 is applied to the image. For this reason, the OETF converting unit 101 applies an OETF conversion in advance to the input image; the OETF conversion is an inverse conversion to EOTF.

The control unit 125 controls the operation of each component of the display apparatus 120 by executing a program stored in the memory 126.

Next, the time dithering unit 102 will be described using a specific example. First, a case will be described in which the frame rate of the display apparatus 120 is 120 Hz (M frames/second (M is a positive real number)), and 8-bit image data is generated by a time dithering process for 10-bit RGB image data.

Figure 2:
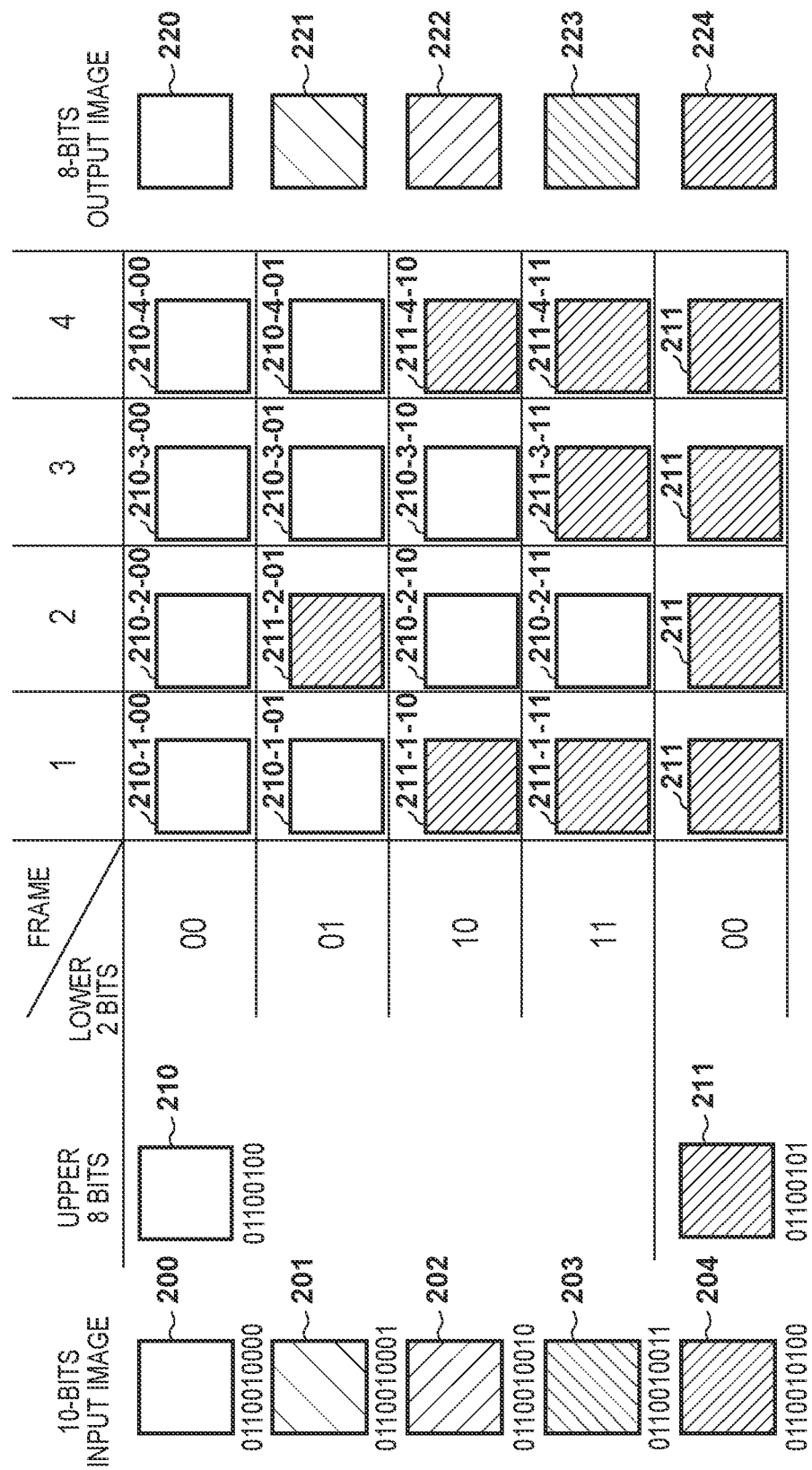
FIG. 2 is a schematic diagram illustrating an example of a time dithering process in the first embodiment.

FIG. 2 is a schematic diagram illustrating an example of a time dithering process in the time dithering unit 102 when the frame rate is 120 Hz. Here, it is assumed that the G data in the pixels 200 to 204 in RGB image data is "0110010000", "0110010001", "0110010010", "0110010011" and "0110010100" in binary.

When outputting 10-bit image data (bit width of A bits (A is a positive integer)) with 8 bits (bit width of B=(A−C) bits), 2 bits (C bits (C is a positive integer)) are the bits to be rounded down (truncated). If the lower 2 bits of the data of the pixels 200 to 203 are rounded down and 8 bits are outputted, all of these pixels become "01100100" as indicated by the pixel 210. Similarly, the data of the pixel 204 takes a value 1 bit larger than the pixel 210 (an intermediate value of 1 step of 8 bits) and becomes "01100101" indicated by the pixel 211. In this case, the value of the bits that are rounded down is "00" for pixels 200 and 204, "01" for pixel 201, "10" for pixel 202, and "11" for pixel 203. In the time dithering process, the value of the output data is switched for each pixel in accordance with the value of the bits to be rounded down.

For the pixel 200, the pixel 210-1-00 is outputted in the first frame, the pixel 210-2-00 is outputted in the second frame, the pixel 210-3-00 is outputted in the third frame, and the pixel 210-4-00 is outputted in the fourth frame. The pixel 210-1-00, the pixel 210-2-00, the pixel 210-3-00, and the pixel 210-4-00 are all "01100100" of the same value as the pixel 210. That is, the value of the pixel 210 is outputted in all four frames for the pixel 200.

For the pixel 201, the pixel 210-1-01 is outputted in the first frame, the pixel 211-2-01 is outputted in the second frame, the pixel 210-3-01 is outputted in the third frame, and the pixel 210-4-01 is outputted in the fourth frame. The pixel 210-1-01, the pixel 210-3-01, and the pixel 210-4-01 are all "01100100" which is the same value as the pixel 210. Further, the pixel 211-2-01 is "01100101" which is the same value as the pixel 211. That is, for the pixel 201, the value of the pixel 210 is outputted three times in four frames, and the value of the pixel 211 is outputted once in four frames. That is, the value of the pixel 210 or the value of the pixel 211 is selectively outputted a number of times corresponding to the ratio in one step of the intermediate value "01".

For the pixel 202, the pixel 211-1-10 is outputted in the first frame, the pixel 210-2-10 is outputted in the second frame, the pixel 210-3-10 is outputted in the third frame, and the pixel 211-4-10 is outputted in the fourth frame. The pixel 210-2-10 and the pixel 210-3-10 are both "01100100" which is the same value as the pixel 210. The pixel 211-1-10 and the pixel 211-4-10 are both "01100101" which is the same value as the pixel 211. That is, for the pixel 202, the value of the pixel 210 is outputted two times in four frames, and the value of the pixel 211 is outputted twice in four frames.

For the pixel 203, the pixel 211-1-11 is outputted in the first frame, the pixel 210-2-11 is outputted in the second frame, the pixel 211-3-11 is outputted in the third frame, and the pixel 211-4-11 is outputted in the fourth frame. Further, the pixel 210-2-11 is "01100100" which is the same value as the pixel 210. The pixel 211-1-11, the pixel 211-3-11, and the pixel 211-4-11 are all "01100101" which is the same value as the pixel 211. That is, for the pixel 203, the value of the pixel 210 is outputted once times in four frames, and the value of the pixel 211 is outputted three times in four frames.

For the pixel 204, similarly to the pixel 200, the value of the pixel 211 is outputted in all four frames.

Here, when an image of a plurality of luminances is displayed in quick succession, the luminance of the image recognized by a person becomes the average luminance of all the displayed images. Therefore, as illustrated in the pixels 221 to 223, it becomes possible to artificially express the gradations of the original pixels 201 to 203 and a smoother gradation will be perceived than the case where the time dithering process is not performed, and visual recognition of an artificial contour will be suppressed. In the above description, the processing is performed on the G data, but the same processing is performed on the R and B data.

In the time dithering process illustrated in FIG. 2, four frames (N frames (N is a positive integer)) are treated as one cycle (a minimum unit). In this case, the dither frequency is 30 Hz which is calculated by the frame rate 120 Hz/4 frames. When the dither frequency is 30 Hz or more (M/N is 30 or more), flicker is mostly inconspicuous.

Figure 3:
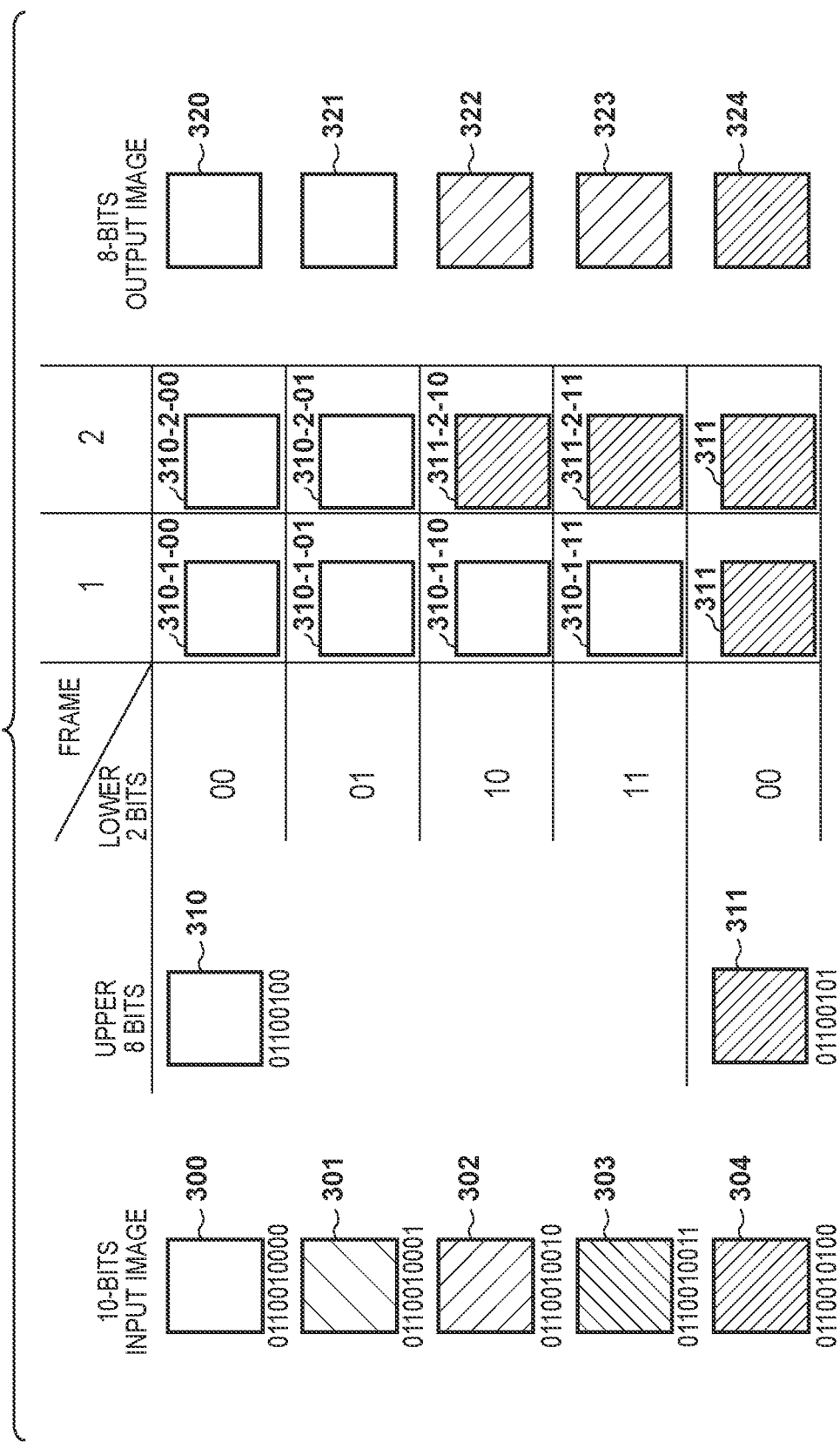
FIG. 3 is a schematic diagram illustrating an example of a time dithering process in the first embodiment.

FIG. 3 is a schematic diagram illustrating a different example of a time dithering process in the time dithering unit 102 when the frame rate of the display apparatus 120 is 60 Hz. Description of parts that are the same as those in the time dithering process illustrated in FIG. 2 is omitted.

The difference from the time dithering process illustrated in FIG. 2 is that when the value of the bits to be rounded down in the G data are "01", the output is equivalent to when the value of the bits to be rounded down is "00", and when the value of the bits to be rounded down is "11", the output is equivalent to the value "10" of the bits to be rounded down. In this case, in the time dithering process of FIG. 3, two frames are treated as one cycle. That is, the dither frequency is 30 Hz which is calculated by the frame rate 60 Hz/2 frames.

In the processing of FIG. 3, as illustrated in pixel 321 to pixel 323, it is possible to express gradations different from the artificial gradations that are visually recognized from the output result of the time dithering process of FIG. 2. Compared to the time dithering process of FIG. 2, the effect of suppressing artificial contour is weaker, but the effect of suppressing secondary flicker is strengthened.

In FIG. 2 and FIG. 3, the frame number for which a pixel value that is one bit larger in the time dithering process is outputted is uniquely determined, but may be freely determined as long as the number of frames in one cycle of the time dithering process is the same as the number of frames for which a pixel that is one bit larger is outputted. For example, configuration may be such that when the value of the lower 2 bits in FIG. 2 is "01", the frame for which the pixel 211 that is 1 bit larger is outputted is not the second frame, but instead the first frame, the third frame, or the fourth frame. Similarly, configuration may be such that when the value of the rounded down bits in FIG. 3 is "11", the frame for which the pixel 311 that is 1 bit larger is outputted is not the second frame, but instead the first frame.

An example in which, when the display frame rate of the display apparatus 120 is 60 Hz or 120 Hz, the time dithering process for converting from 10 bits to 8 bits has been described, but the present embodiment is not limited thereto. The display frame rate of the display apparatus 120, the bit precision of the processing of the input image and the bit precision of the external data transmission line 110 in the image processing apparatus 100 can be changed. Therefore, it is sufficient to apply a time dithering process that maintains a dither frequency of 30 Hz in accordance with the frame rate and bit precision described above.

As an example in which the bit width of the external data transmission line 110 is different, a case where the frame rate is 60 Hz and 10 bits is converted to 6 bits will be described. To maintain the dither frequency of 30 Hz and suppress artificial contours, it is sufficient to apply the time dithering process illustrated in FIG. 3 and use the time dithering process referring to 2 bits: the 4th lowest bit and the 3rd lowest bit.

Next, as an example in which the display frame rate, the input image and the processing bit precision in the image processing apparatus 100, and the bit precision of the external data transmission line 110 are all different, a case in which the frame rate is 240 Hz and 12 bits are converted to 8 bits will be described. In this case, in order to maintain the dither frequency of 30 Hz and increase suppression of artificial contours, it is preferable to use a time dithering process that requires eight frames and references three bits: from the fourth lowest bit to the second lowest bit.

Depending on the video standard, it may be difficult to achieve a dither frequency of 30 Hz by a time dithering process. In such cases, the time dithering process is applied to bring the dither frequency close to 30 Hz. For example, if the display frame rate is 59.94 Hz, the time dithering process described in FIG. 3 is applied to a frequency of 29.97 Hz by time dithering process. As another example, if the display frame rate is 50 Hz, the time dithering process described in FIG. 3 is applied to make the frequency according to the time dithering process 25 Hz (M/N is 25 or more).

Next, a case in which image data differs for each frame, such as with moving image data, for the time dithering unit 102 will be described.

Figure 4:
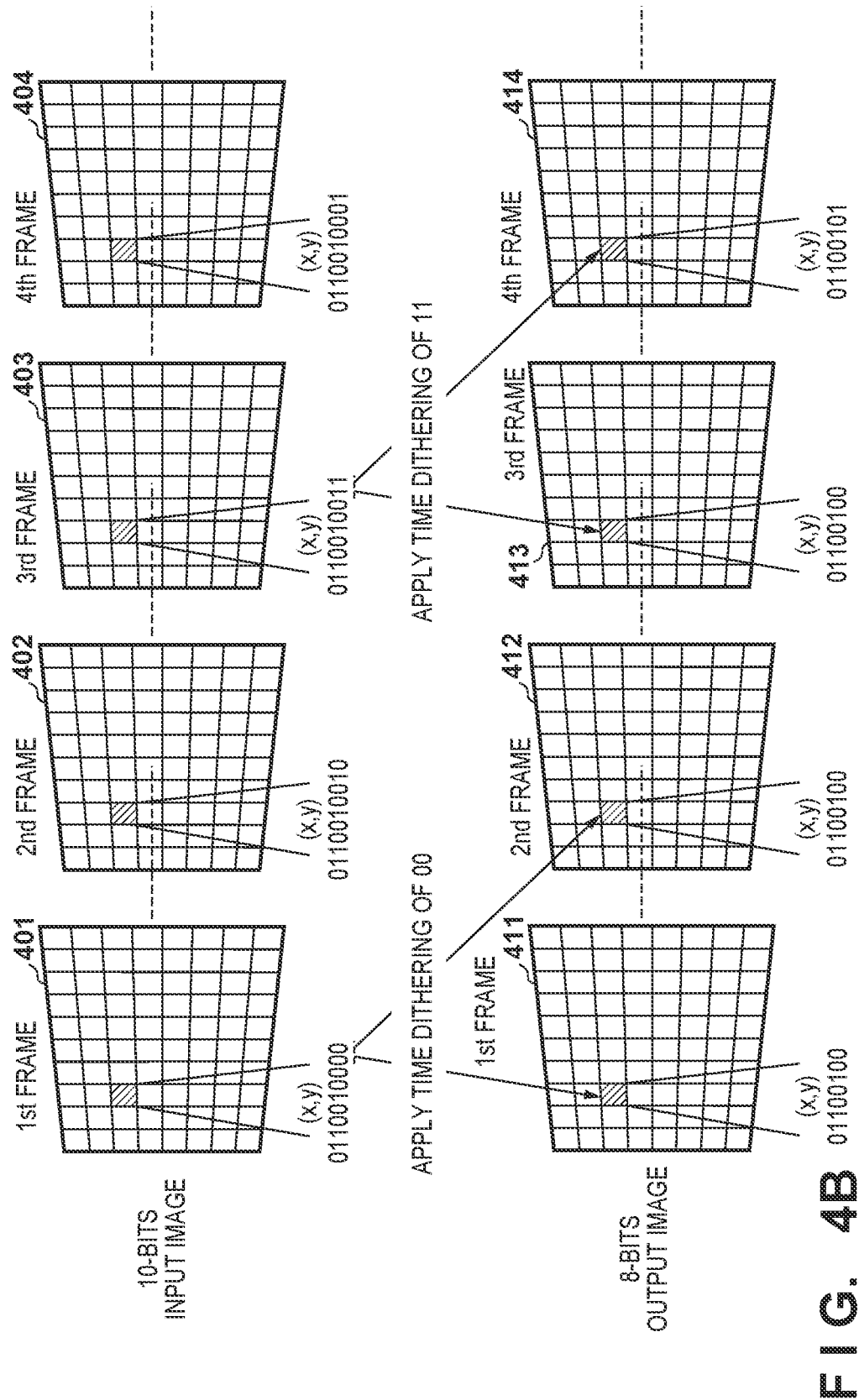
FIG. 4A and FIG. 4B are schematic diagrams illustrating an example of a time dithering process for one pixel of moving image data in the first embodiment.

FIG. 4A and FIG. 4B are diagrams illustrating an exemplary method of applying the time dithering process to one pixel of moving image data when the display frame rate is 60 Hz. In the time dithering process illustrated in FIG. 4A and FIG. 4B, the start frame of the time dithering period performs the time dithering process according to the value of the lower 2 bits of the input image. On the other hand, in a frame other than the start frame, the time dithering process is performed in accordance with the value of the lower 2 bits of the start frame of the time dithering period at that time, rather than the value of a predetermined bit of the input image.

For example, description is given of a case where the time dithering process in FIG. 3 is used to convert from 10 bits to 8 bits at the coordinates (x, y) in each of the frames 401 to 404 in FIG. 4A. The pixel value of the coordinates (x, y) is "0110010000" in the case of the first frame 401, "0110010010" in the case of the second frame 402, "0110010011" in the case of the third frame 403, and "0110010001" in the case of the fourth frame 404.

The lower two bits of the pixel value of the coordinates (x, y) of the first frame 401 are "00". The first frame 401 is a start frame in the time dithering cycle of FIG. 3. Therefore, in relation to the coordinates (x, y) of the first frame 401, the pixel 310-1-00 illustrated in FIG. 3 is outputted. That is, at the coordinates (x, y) of the first frame 401, the value of the pixel 310, which is the upper 8 bits of the input pixel, is output. The lower two bits of the pixel value of the coordinates (x, y) of the second frame 402 are "10". The second frame 402 is a frame other than the start frame of the time dithering cycle in FIG. 3, and the lower 2 bits of the start frame of the time dithering cycle in this case are "00". Therefore, in relation to the coordinates (x, y) of the second frame 402, the pixel 310-2-00 illustrated in FIG. 3 is outputted. That is, at the coordinates (x, y) of the second frame 402, the value of the pixel 310 is output. The lower two bits of the pixel value of the coordinates (x, y) of the third frame 403 are "11". The third frame 403 is a new start frame in the time dithering cycle of FIG. 3. Therefore, in relation to the coordinates (x, y) of the third frame 403, the pixel 310-1-11 illustrated in FIG. 3 is outputted. That is, at the coordinates (x, y) of the third frame 403, the value of the pixel 310 is output. For the coordinates (x, y) of the fourth frame 404, the time dithering process referring to the value of the lower 2 bits of the third frame is used similarly to the case of the second frame, and therefore the pixel 311-2-11 illustrated in FIG. 3 is outputted. That is, at the coordinates (x, y) of the fourth frame 404, the value of the pixel 311 is outputted. The pixel values outputted in the respective frames of the coordinates (x, y) by the above-described time dithering process are illustrated in FIG. 4B. In this case, the pixel value output in the first frame 411, the second frame 412, and the third frame 413 for the coordinates (x, y) is "01100100", the pixel value output in the fourth frame 414 is "01100101".

Figure 5:
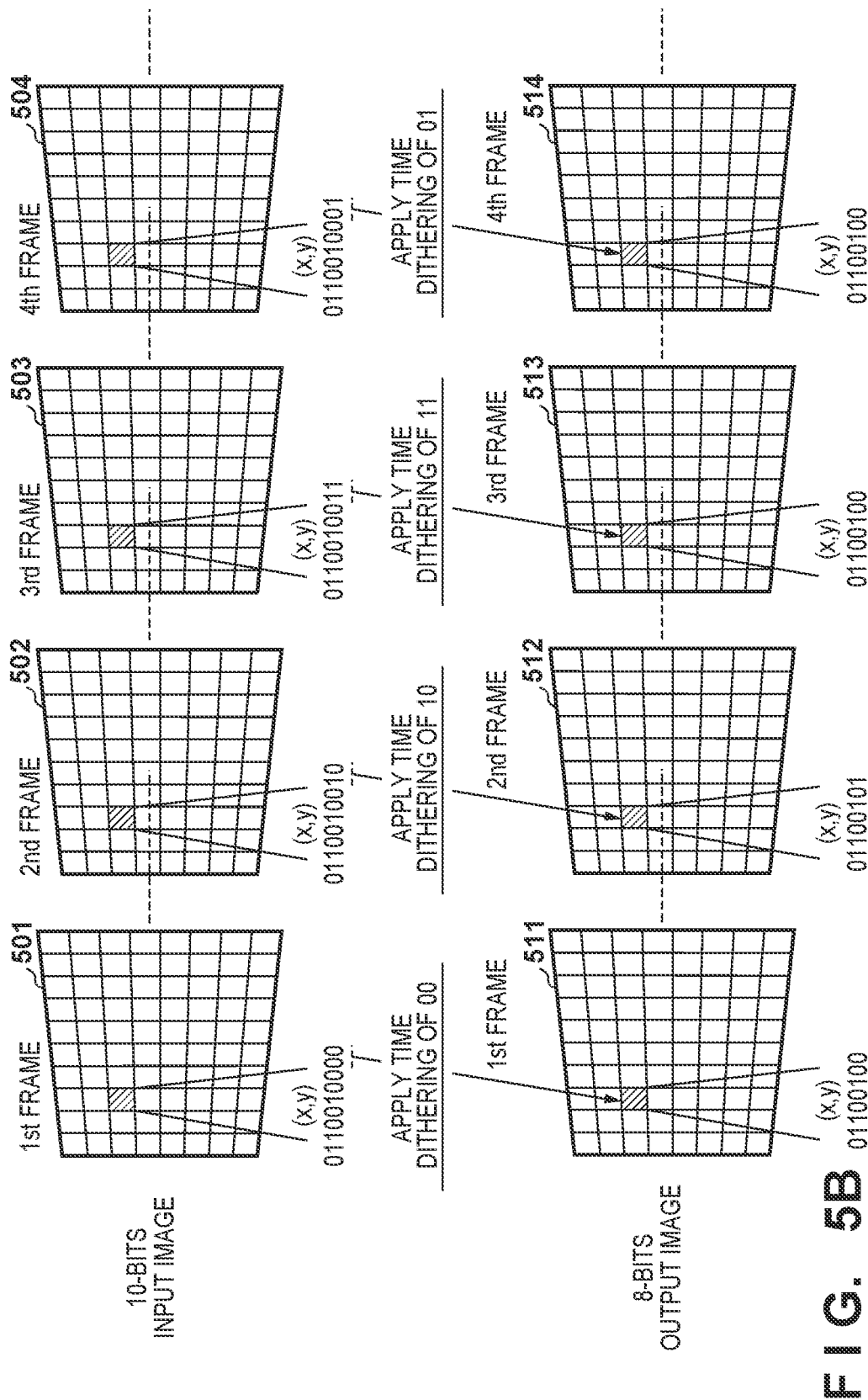
FIG. 5A and FIG. 5B are schematic diagrams illustrating an example of a time dithering process for one pixel of moving image data in the first embodiment.

FIG. 5A and FIG. 5B are diagrams illustrating examples of a different method of applying the time dithering process to one pixel of the moving image data. Description of parts that are the same as those in the time dithering process illustrated in FIG. 4A and FIG. 4B is omitted.

The difference from the time dithering process illustrated in FIG. 4A and FIG. 4B is that, at the coordinates (x, y), in the case of the second frame 502, the time dithering process for where lower 2 bits in FIG. 3 are "10" for the frame number 2 is applied. Further, in the case of the fourth frame 504, the time dithering process for where the lower 2 bits are "01" for the frame number 2 is applied. Here, as illustrated in FIG. 5A, for the second frame 502 and the fourth frame 504, a time dithering process corresponding to the lower two bits of the pixel value of the frame is applied at the coordinates (x, y). The pixel values outputted in the respective frames of the coordinates (x, y) by the above-described time dithering process are illustrated in FIG. 5B. In this case, the pixel value outputted in the first frame 511, the third frame 513, and the fourth frame 514 for the coordinates (x, y) is "01100100", the pixel value output in the second frame 512 is "01100101".

Here, in the time dithering process illustrated in FIG. 5A and FIG. 5B, the bits of each pixel are referenced every frame, and the time dithering process corresponding to the lower 2 bits of the input pixel for each frame is applied to all the frames.

In the processing of FIG. 5A and FIG. 5B, as illustrated in the frames 511 to 514, it is possible to express gradations different from the artificial gradation that are visually recognized from the method of applying the time dithering process of FIG. 4A and FIG. 4B. Compared to method for applying the time dithering process described in FIG. 4A and FIG. 4B, the number of times the lower two bits of the pixel value of the frame are referenced increases, but the output of the pixels is closer to the original gradations.

As described above, in the first embodiment, the time dithering process is changed so as to maintain the dither frequency at 30 Hz in accordance with the display frame rate. Thus, while suppressing the flicker generated when displaying an image on the display unit 124, it is possible to suppress artificial contours. Similarly, in a case where it is difficult to make the dither frequency 30 Hz, it is possible to suppress artificial contours by changing the time dithering process so as to maintain a frequency close to 30 Hz, while suppressing flicker generated when displaying an image on the display unit 124.

Second Embodiment

In the first embodiment, in the time dithering process illustrated in FIG. 3, the output of some of the pixels is the same value, so that the ability to express gradations is lower than the time dithering process illustrated in FIG. 2. In the second embodiment, a description will be given of a method of improving the ability to express gradations when the time dithering process illustrated in FIG. 3 is applied.

Figure 6:
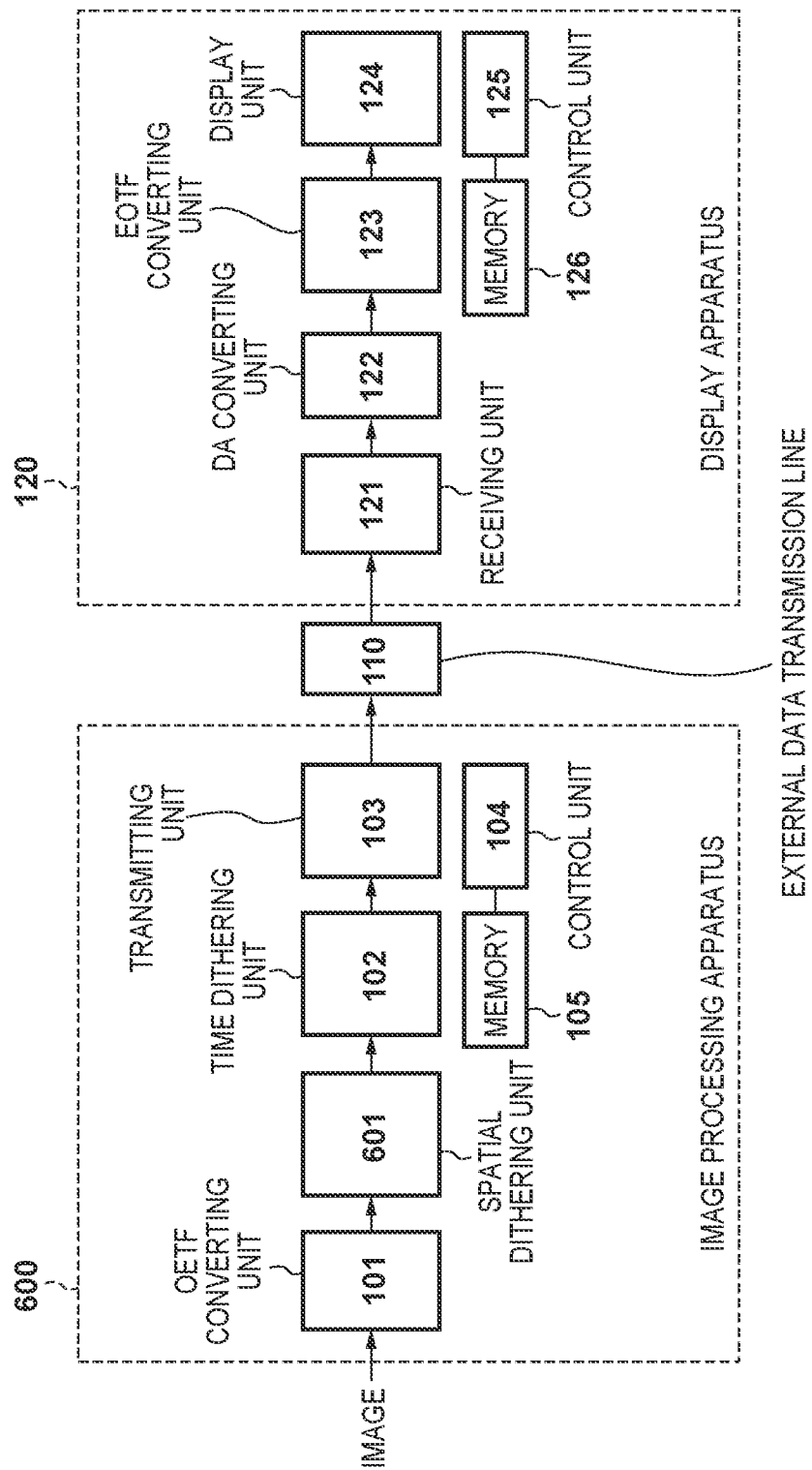
FIG. 6 is a block diagram illustrating a configuration example of an image display system according to a second embodiment.

FIG. 6 is a block diagram illustrating a configuration example of an image display system according to a second embodiment of the present invention. Parts that are the same as those of the image display system according to the first embodiment are denoted by the same reference numerals, and description thereof is omitted.

The image display system of the second embodiment is configured to include an image processing apparatus 600, an external data transmission line 110, and a display apparatus 120.

A spatial dithering unit 601 performs a spatial dithering process for changing the image data in accordance with the value of a predetermined bit in the acquired image data. The spatial dithering process is a technique in which, gradations are artificially increased in the image data by performing processing that adds to values outside valid bits which are rounded down of a target pixel and an adjacent pixel, and changing data of pixels exceeding a threshold value. The spatial dithering unit 601 may be an independent circuit, or may be realized by the control unit 104 executing a program stored in the memory 105.

Next, specific processing of the spatial dithering unit 601 and the time dithering unit 102 in the present embodiment will be described. First, a case will be described in which the frame rate of the display apparatus 120 is 60 Hz, spatial dithering process and time dithering process are performed on 10-bit RGB image data, and 8-bit image data is generated.

Figure 7:
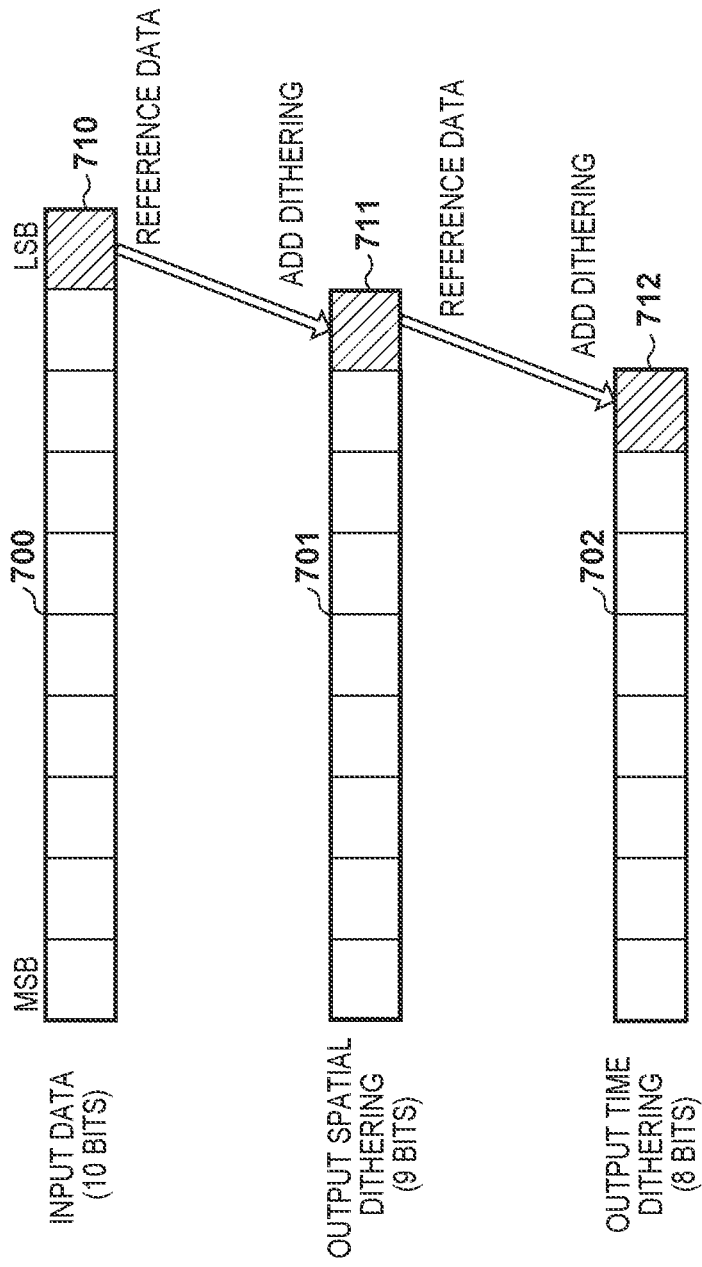
FIG. 7 is a schematic diagram illustrating a spatial dithering process and a time dithering process in the second embodiment.

FIG. 7 is a schematic diagram illustrating dither processing in the spatial dithering unit 601 and the time dithering unit 102 in the case where the frame rate is 60 Hz.

First, 10-bit image data 700 is inputted to the spatial dithering unit 601. The spatial dithering unit 601 performs a spatial dithering process on the least significant bit 710 of the 10-bit image data 700. This spatial dithering process outputs 9 bits of image data 701. At this time, by the spatial dithering process, the least significant bit 710 of the 10-bit input data 700 is reflected in the least significant bit 711 of the 9-bit image data 701. The 9-bit image data 701 output from the spatial dithering unit 601 is input to the time dithering unit 102. The time dithering unit 102 performs a time dithering process on the 9-bit image data 701. This time dithering process outputs 8 bits of image data 702. At this time, the least significant bit 712 of the 8-bit image data 702 is reflected in the least significant bit 711 of the 9-bit image data 701.

As illustrated in FIG. 7, the spatial dithering unit 601 and the time dithering unit 102 output 8-bit image data in which all values outside the valid bits are reflected in the valid bits. Further, since the time dithering process in this case is a time dithering process that requires two frames, in the display apparatus 120 of the frame rate of 60 Hz, the dither frequency is 30 Hz.

Next, the spatial dithering unit 601 will be described. First, a case will be described in which a spatial dithering process is performed on 10-bit RGB image data to generate 9-bit image data.

Figure 8:
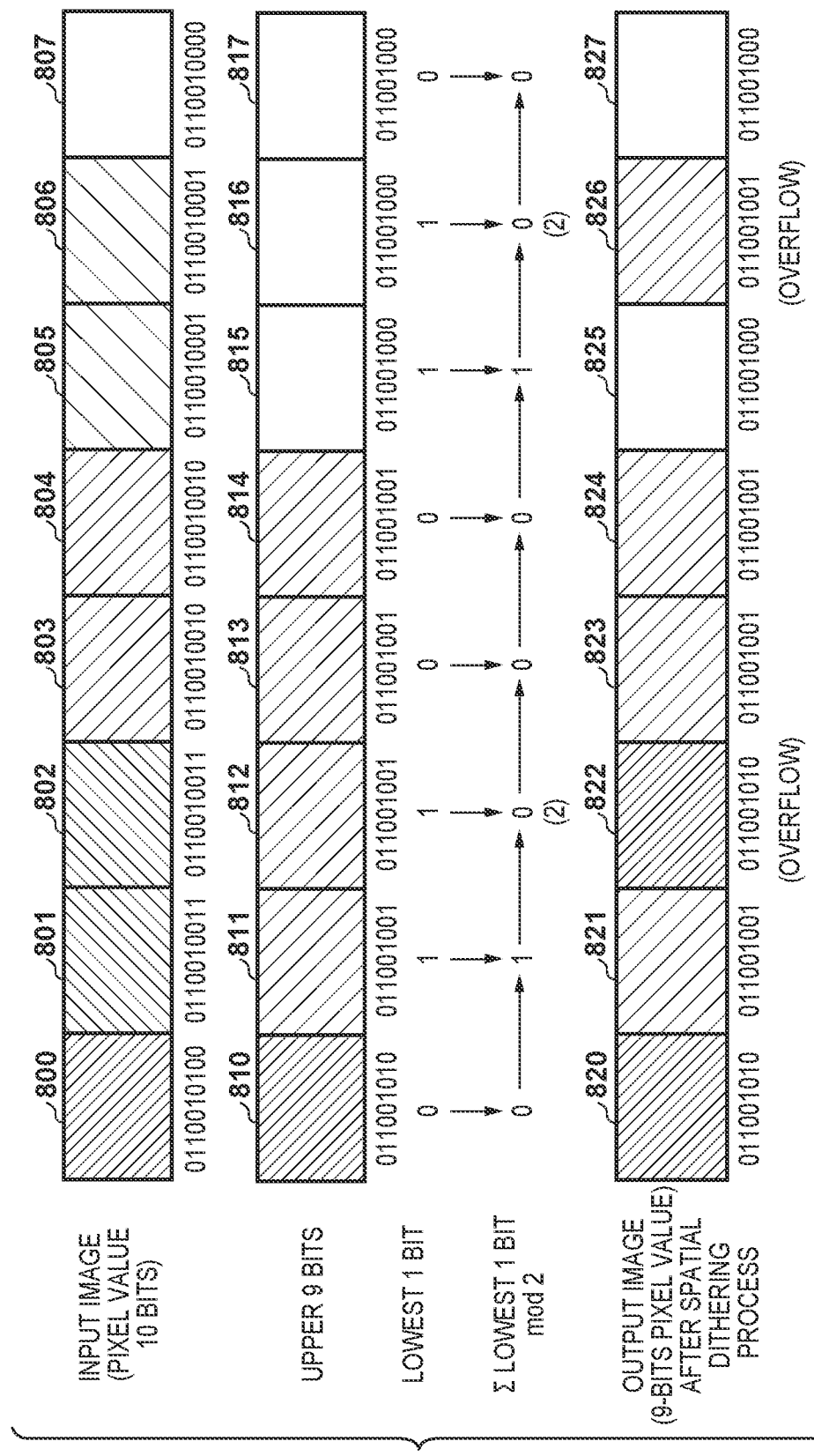
FIG. 8 is a schematic diagram illustrating an example of the spatial dithering process in the second embodiment.

FIG. 8 is a schematic diagram illustrating an example of the spatial dithering process in the spatial dithering unit 601. Here, it is assumed that the G data in the pixels 800 to 807 in RGB image data is "0110010100", "0110010011", "0110010011". "0110010010". "0110010010", "0110010001", "0110010001", and "0110010000" in binary.

If the lowest 1 bit of the data of the pixel 800 is rounded down and 9 bits are outputted, the result is "011001010" as indicated by the pixel 810. Similarly, the data of the pixels 801 to 804 becomes "011001001" as indicated by the pixels 811 to 814, and the data of the pixels 805 to 807 becomes "011001000" as indicated by the pixels 815 to 817. In this case, the value of the bits that are rounded down is "1" for pixels 801, 802, 805 and 806, and "0" for pixels 800, 803, 804, and 807.

In the spatial dithering process, the value of the bit to be rounded down is added to an adjacent pixel, and the value of the output data is switched. In the pixels 802 and 806, the value obtained by adding the values of the lowest 1 bit is 2. Since the 1-bit significant figure is 1, the pixels 802 and 806 overflow. Here, for the pixels 802 and 806, a pixel that is 1 bit larger is outputted. That is, for the pixel 802, "011001010" is outputted, and for the pixel 806, "011001001" is outputted.

The above spatial dithering process reflects the bit that is rounded down in the valid bits of some pixels. Therefore, as illustrated in the pixels 820 to 827, it is possible to express the original gradation throughout the horizontal direction as a whole, and an artificial contour is suppressed more than when the spatial dithering process is not performed. The processing is described as being performed on the G data in this example, but the same processing is performed on the R and B data.

Next, the time dithering unit 102 will be described. First, a case will be described in which the frame rate of the display apparatus 120 is 60 Hz, time dithering process is applied to 9-bit RGB image data, and 8-bit image data is generated.

Figure 9:
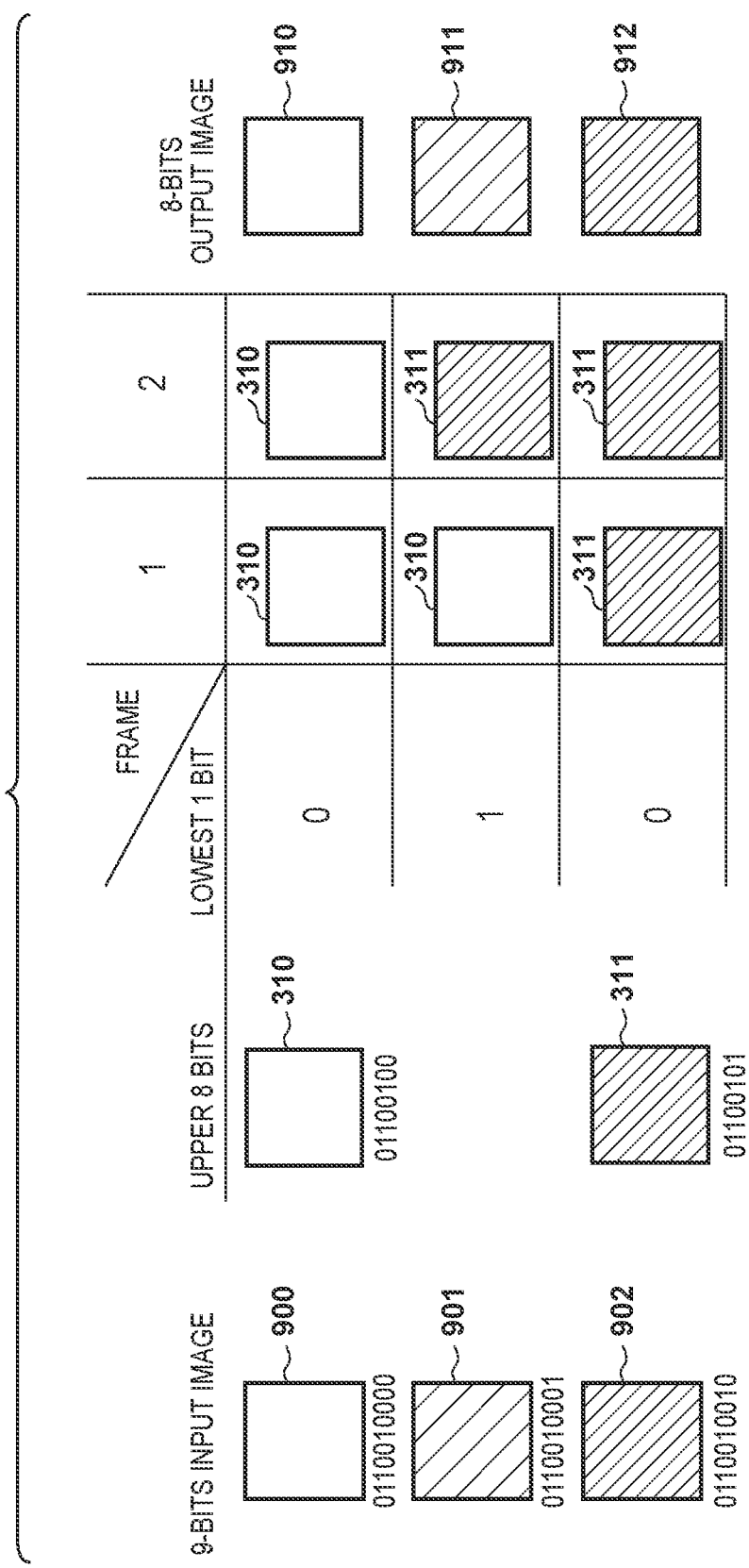
FIG. 9 is a schematic diagram illustrating an example of a time dithering process in the second embodiment.

FIG. 9 is a schematic diagram illustrating an example of the time dithering process in the time dithering unit 102. Here, it is assumed that the G data in the pixels 900 to 902 is "0110010000", "0110010011" and "0110010100" in binary. Also, description of parts that are the same as those in the time dithering process illustrated in FIG. 3 is omitted.

The difference from the time dithering illustrated in FIG. 3 is that only one bit is rounded down. Here, when the value of the bit to be rounded down is "0", the output is the same as when the value of the bit to be rounded down in FIG. 3 is "00" or "01". Similarly, when the value of the bit to be rounded down is "1", the output is the same as when the value of the bit to be rounded down in FIG. 3 is "10" or "1". At this time, in the time dithering process of FIG. 9, two frames are treated as one cycle. That is, the dither frequency is 30 Hz which is calculated by the frame rate 60 Hz/2 frames. The processing is described as being performed on the G data in this example, but the same processing is performed on the R and B data.

Figure 10:
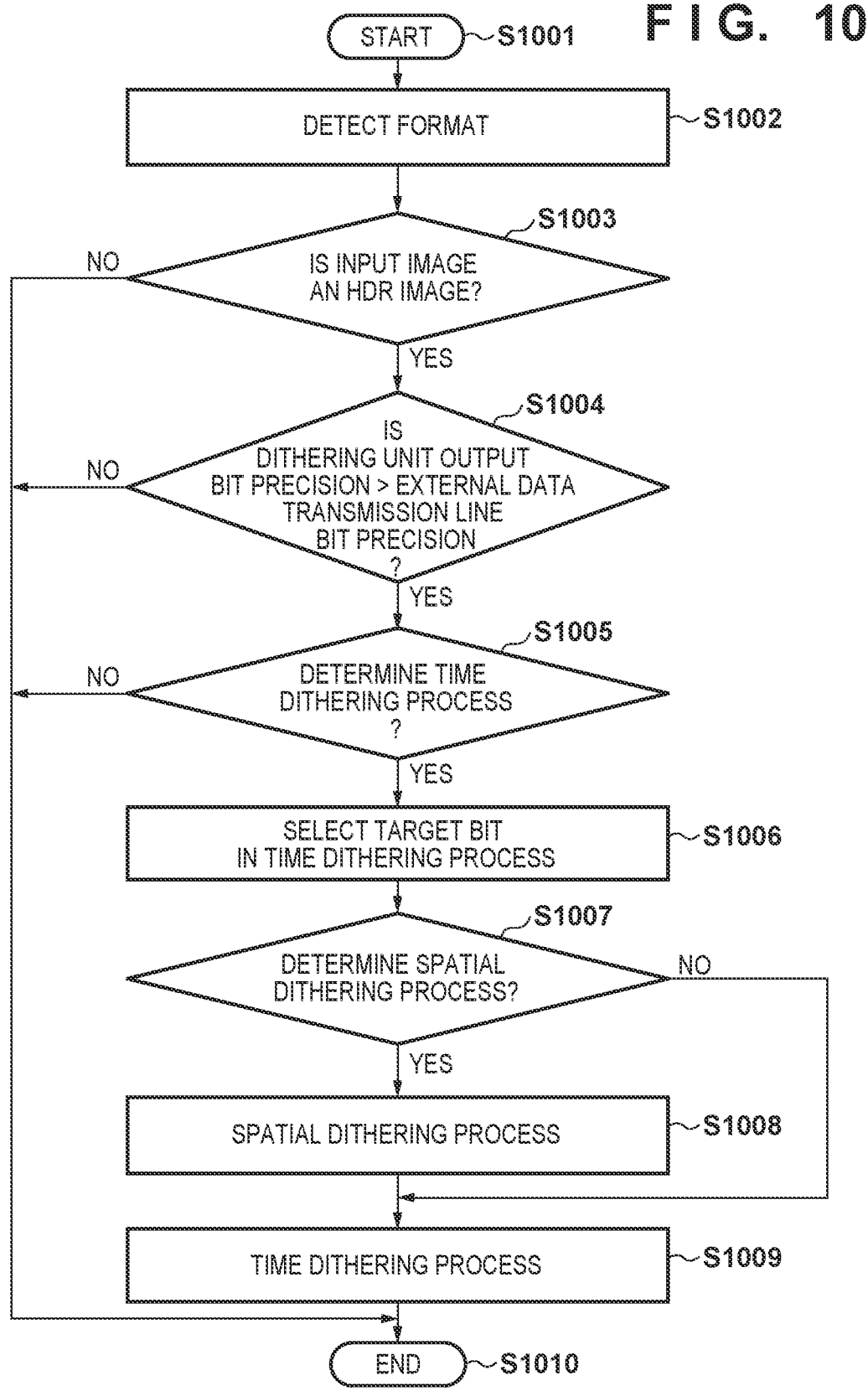
FIG. 10 is a flowchart illustrating a spatial dithering process and a time dithering process in the second embodiment.

FIG. 10 is a flowchart illustrating a spatial dithering process and a time dithering process in the present embodiment. The operation of this flowchart is performed by the control unit 104 executing a program stored in the memory 105.

First, in step S1001, the control unit 104 starts the flow.

In step S1002, according to an instruction from the control unit 104, the OETF converting unit 101 detects the format of an inputted image.

In step S1003, according to an instruction from the control unit 104, the spatial dithering unit 601 determines whether or not the inputted image is an HDR image. If not an HDR image, the process proceeds to step S1010, and the flow ends.

When the input image is an HDR image (step S1003: YES), in step S1004, the spatial dithering unit 601 compares the output bit precision of the time dithering unit 102 with the bit precision of the external data transmission line 110 according to an instruction from the control unit 104. When the outputted bit precision of the time dithering unit 102 is equal to or less than the bit precision of the external data transmission line 110, the processing proceeds to step S1010, and the flow ends.

When the output bit precision of the time dithering unit 102 is larger than the bit precision of the external data transmission line 110 (step S1004: YES), in step S1005, the control unit 104 instructs the time dithering unit 102 whether or not to perform the time dithering process. In the present embodiment, the control unit 104 determines to perform the time dithering process when the frame rate is 60 Hz or more. If the frame rate is less than 60 Hz, the process proceeds to step S1010, and the flow ends. It is assumed that the time dithering unit 102 and the spatial dithering unit 601 mutually exchange information used for control via a data bus (not illustrated).

When the frame rate is 60 Hz or more (step S1005: YES), in step S1006, the time dithering unit 102 selects a bit for which to perform the time dithering process (hereinafter referred to as the time dithering target bit) according to an instruction from the control unit 104. In the present embodiment, it is assumed that the time dithering target bit is the second lowest bit. Then, the time dithering target bit is outputted to the spatial dithering unit 601 via the data bus.

In step S1007, the instruction of the control unit 104 refers to the time dithering target bit acquired from the time dithering unit 102, and determines whether or not to perform the spatial dithering process. Whether or not the spatial dithering process is performed is determined based on whether or not a bit other than the time dithering process target bit are present among the bits outside the valid bits. If there are no bits other than the time dithering process target bit, the process proceeds to step S1009.

When there is a bit other than the time dithering process target bit (step S1007: YES), the process proceeds to step S1008, and the spatial dithering unit 601 performs the spatial dithering process according to an instruction of the control unit 104.

In step S1009, according to an instruction from the control unit 104, the time dithering unit 102 performs the time dithering process on the bit selected in step S1006, and proceeds to step S1010 to end the present flow.

In the above description, a case where the display frame rate of the display apparatus 120 is 60 Hz and a conversion from 10 bits to 8 bits is performed has been described, but the present invention is not limited to this. For example, a case where the display frame rate of the display apparatus 120 is 120 Hz, the processing bit precision of the image processing apparatus and the input image is 10 bits, and the bit precision of the external data transmission line is 6 bits will be described below.

In this case, the time dithering process is applied to two bits: the seventh bit and the eighth bit. Also, the spatial dithering process is applied to the 9th bit or to both the 9th bit and the 10th bit. In this case, the time dithering process requires 4 frames and the dither frequency is 30 Hz.

Therefore, the bit widths of the time dithering process and the spatial dithering process and the range of bits on which they are applied are illustrated by the following conditional expressions.

The number of frames of the time dithering unit 102 is N (N is an integer equal to or greater than 2), the bit width of the input image is A, and the bit width of the external data transmission line is B. In this case, the bit width of the time dithering process is N/2, for the range of the bits on which the time dithering process is performed, the most significant bit can be expressed as $A-B-1$ and the least significant bit as $A-B-(N/2)$.

The spatial dithering process is performed when $A-B-(N/2)-1$, which is the bit width, is 0 or more. In this case, for the range of bits for which the spatial dithering process is performed, the most significant bit can be expressed as $A-B-(N/2)-1$ and the least significant bit can be expressed as 0.

In the present embodiment, since N=2, A=10, B=8, the bit width of the time dithering process is 1, the range of bits for performing the time dithering process is the 2nd lowest bit. The bit width for the spatial dithering process is 1, and the range of bits for performing the spatial dithering process is the least significant bit.

In FIG. 8, the spatial dithering process is applied in the horizontal direction, but may be applied in the vertical direction, an oblique direction, or all of the above directions.

In the present embodiment, the time dithering process is applied after the spatial dithering process, but the present invention is not limited to this, and the spatial dithering process may be performed after the time dithering process. For example, in FIG. 7, the time dithering process is applied to 10-bit data and 9-bit image data is outputted. Then, a spatial dithering process is applied to the 9-bit image data and an 8-bit image data is output.

In FIG. 10, in step S1005, the case where the frame rate of the display apparatus is 60 Hz or more was a branch condition, but the condition and the processing may be changed to follow the standard of the video. For example, the branch condition at step S1005 is that the frame rate of the display apparatus is 59.94 Hz or higher, and the time dithering process is applied so as to maintain 29.97 Hz as the dither frequency. Similarly, the branch condition at step S1005 is that the frame rate of the display apparatus is 50 Hz or higher, and the time dithering process is applied so as to maintain 25 Hz as the dither frequency.

As described above, in the second embodiment, the time dithering process is changed so as to maintain the dither frequency at 30 Hz in accordance with the frame rate of the display apparatus, and the spatial dithering process is applied within the rounded down bits to any bit to which the time dithering process is not applied. By combining the time dithering process and the spatial dithering process, it is possible to suppress flicker generated when displaying an image on the display unit 124, and to suppress artificial contours while reflecting arbitrary bits to be rounded down in the display bits.

Similarly, when it is difficult to set the dither frequency to 30 Hz, the time dithering process is changed so as to maintain a frequency close to 30 Hz as the dither frequency, and the spatial dithering process is applied to any of bits to which the time dithering process is not applied within the rounded down bits. As a result, it is possible to suppress artificial contours while suppressing flicker generated when displaying an image on the display unit 124 and reflecting arbitrary bits to be rounded down in the display bits.

Third Embodiment

Figure 11:
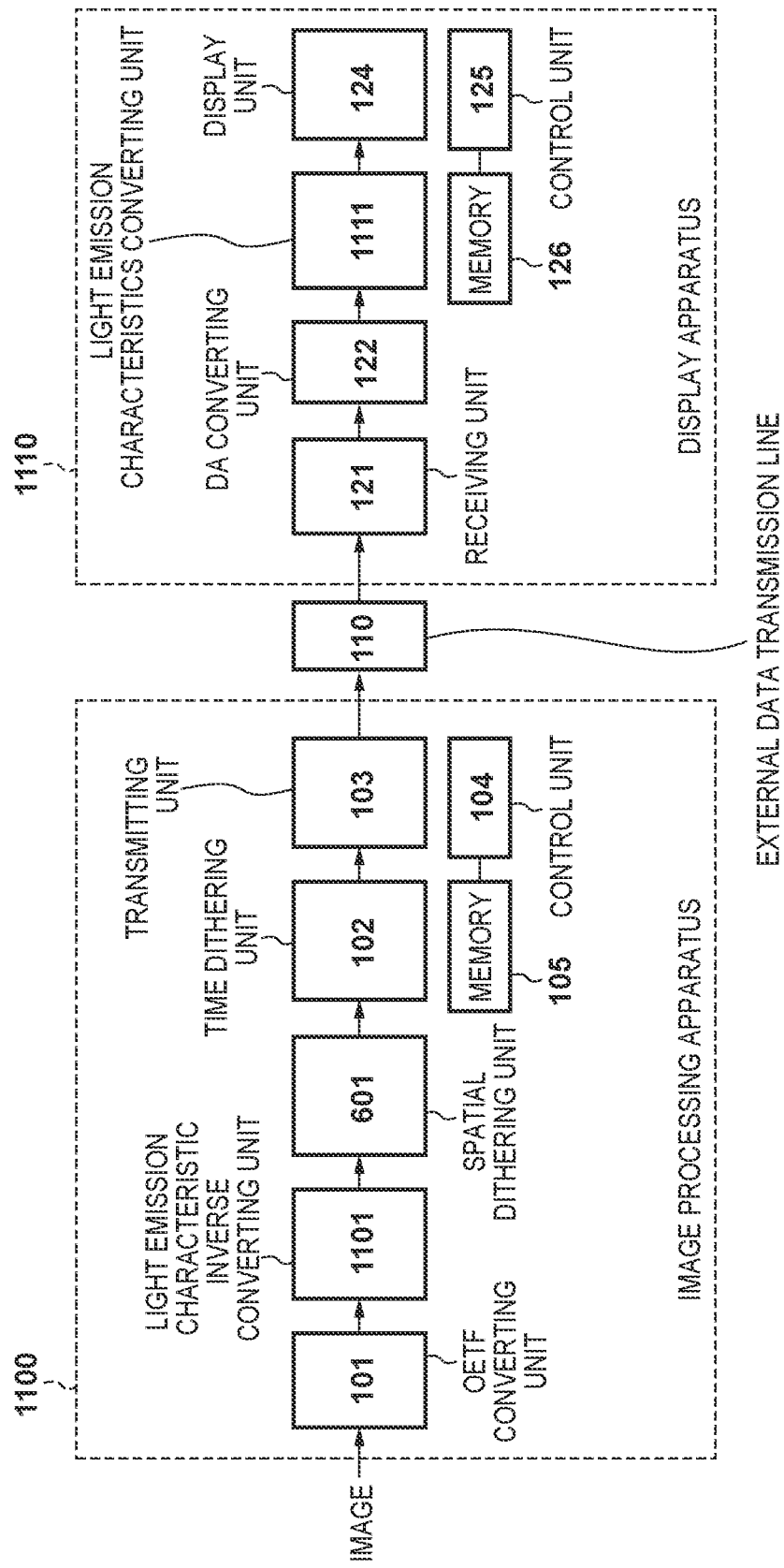
FIG. 11 is a block diagram illustrating a configuration example of an image display system according to a third embodiment.

FIG. 11 is a block diagram illustrating a configuration example of an image display system according to a third embodiment of the present invention. Parts that are the same as those of the image display system according to the first embodiment and the second embodiment of the present invention are denoted by the same reference numerals, and description thereof is omitted.

The image display system of the present embodiment is configured to include an image processing apparatus 1100, an external data transmission line 110, and a display apparatus 1110.

A light emission characteristic inverse converting unit 1101 performs processing of the inverse conversion of a light emission characteristic converting unit 1111 based on the display unit 124. FIG. 12 is a detailed block diagram of the light emission characteristic inverse converting unit 1101. Note that the light emission characteristic inverse converting unit 1101 may be an independent circuit, or may be realized by the control unit 104 executing a program stored in the memory 105. Similarly, the light emission characteristic converting unit 1111 may be an independent circuit, or may be realized by the control unit 125 executing a program stored in the memory 126.

In FIG. 12, since the RGB pixels constituting the display unit 124 have respective individual light emission characteristics, the light emission characteristic inverse converting unit 1101 has the light emission characteristic inverse converting units 1101-01, 1101-02, and 1101-03 for R, G, and B respectively. RGB image data whose light emission characteristics were inversely converted is outputted after a white balance adjustment is performed thereon by a white balance adjusting unit 1101-04 (hereinafter, WB adjustment unit). The processing order of the light emission characteristics inverse conversion and the white balance may be reversed or they may be performed simultaneously.

The light emission characteristic converting unit 1111 converts the analog image signal acquired from the DA converting unit 122 into light emission characteristics based on RGB pixels constituting the display unit 124. An inverse conversion of light emission characteristics needs to be applied to an image to be displayed on the display unit 124 before a DA conversion. In the case of an HDR display that is susceptible to the gradation failure, an inverse conversion process of light emission characteristics approximating OETF of the HDR is performed on the output data of OETF converting unit 101 whose bit precision is equal to or greater than the external data transmission line 110. This makes it possible to reduce quantization error and calculation error, and to minimize gradation failure of the display image.

In the present embodiment, although the spatial dithering unit 601 is provided in the image processing apparatus 1100, configuration may be taken to not provide it depending on the situation.

The light emission characteristic inverse converting unit 1101 may be provided in the display apparatus 1110. In that case, placing the light emission characteristic inverse converting unit 1101 between the receiving unit 121 and the DA converting unit 122. In this case, the light emission characteristic inverse converting unit 1101 may be an independent circuit, or may be realized by the control unit 125 executing a program stored in the memory 126. While EOTF of ITU BT. 709 or the like is normalized on the assumption of light emission characteristics of a cathode ray tube, or the like, EOTF assuming light emission characteristics of organic EL or the like is not normalized. Since light emission characteristics change due to environmental differences such as the temperature of the display configuration, differences in the applied voltage, and individual differences in the display configuration itself, it is necessary to correct for such differences. The image processing apparatus 1100 is connected to a display apparatus 1110 via an external data transmission line 110. The image processing apparatus 1100 and the display apparatus 1110 are independent from each other, and it is assumed that they are selected from a plurality of image processing apparatuses 1100 and a plurality of display apparatuses 1110 and are used in combination. Performing a correction of light emission characteristics in the display apparatus 1110 specific to the display unit 124 in consideration of such combinations facilitates control. Therefore, the inverse conversion of the light emission characteristics is performed by the display apparatus 1110, and the image data of the external data transmission line 110 is data conforming to a generalized standard. In this case, by reducing quantization error and calculation error of inverse conversion of the light emission characteristics of the display apparatus 1110 by HDR OETF which approximates light emission characteristics of an organic EL or the like, gradation failure of the display image can be minimized.

Fourth Embodiment

In the first embodiment, the second embodiment, and the third embodiment, in order to perform a time dithering process to maintain about 30 Hz as a dither frequency in order to suppress flicker, the frame rate of the display apparatus was assumed to be 60 Hz or 50 Hz or more. In the fourth embodiment, a description will be given of a control method for a case when the frame rate of the display apparatus is less than 60 Hz and 50 Hz in the block configuration of FIG. 6 and FIG. 11.

In FIG. 13A illustrated in the example of the case where the number of frames N of the time dithering unit 102 is "2". When the display frame rate M is changed to 15 Hz, 30 Hz, 60 Hz, 120 Hz, or 240 Hz, the time dithering frequency M/N becomes 7.5 Hz, 15 Hz, 30 Hz, 60 Hz, or 120 Hz.

Since flicker can be suppressed when the time dithering frequency is 30 Hz or more, the time dithering process is not performed at the display frame rates 15 Hz and 30 Hz where the time dithering frequency is less than 30 Hz. Instead, the spatial dithering process is performed at the display frame rates of 15 Hz and 30 Hz for artificial contour reduction. At a display frame rate of 60 Hz or higher, the artificial contour reduction effect is enhanced while suppressing flicker by using both the time dithering process and the spatial dithering process.

In FIG. 13B illustrated in the example of the case where the number of frames N of the time dithering unit 102 is changed. When the display frame rate M is 15 Hz, 30 Hz, and 60 Hz, N is set to "2", when M is 120 Hz, N is set to "4", and when M is 240 Hz, N is set to "8". By increasing the number of frames N of the time dithering process, the artificial contour reduction effect is enhanced by improving the ability to express gradations. In addition, similarly to FIG. 13A, the time dithering processing is not performed at the display frame rates of 15 Hz and 30 Hz, where the time dithering frequency is less than 30 Hz. Instead, the spatial dithering process is performed at the display frame rates of 15 Hz and 30 Hz for artificial contour reduction. At a display frame rate of 60 Hz or higher, the artificial contour reduction effect is enhanced while suppressing flicker by using both the time dithering process and the spatial dithering process.

FIG. 13C illustrates an example in which an image to be inputted to the image processing apparatuses 600 and 1100 is a moving image. Since flicker is more conspicuous in a moving image than in a still image, the time dithering process is not performed at a time dithering frequency of less than 60 Hz. When the display frame rate M is 15 Hz, 30 Hz, 60 Hz, and 120 Hz, N is set to "2", and when M is 240 Hz, N is set to "4". By increasing the number of frames N of the time dithering process, the artificial contour reduction effect is enhanced by improving the ability to express gradations. In moving images, the time dithering process is not performed at 60 Hz or less which is a display frame rate where the time dithering frequency is 30 Hz or less. Instead, the spatial dithering process is performed at the display frame rates of 60 Hz or less for artificial contour reduction. In addition, when the display frame rate is 120 Hz or higher, since artificial contour reduction effect by time dithering is low when N is small, the artificial contour reduction effect is enhanced while suppressing flicker by using both the time dithering process and the spatial dithering process together.

Fifth Embodiment

In the fifth embodiment, a method of switching the time dithering pattern according to the hue of the input image data will be described.

The configuration of the image display system according to the fifth embodiment is the same as the block diagram of FIG. 1 illustrating the first embodiment. Parts that are the same as those of the image display system according to the first embodiment are denoted by the same reference numerals, and description thereof is omitted.

Figure 14:
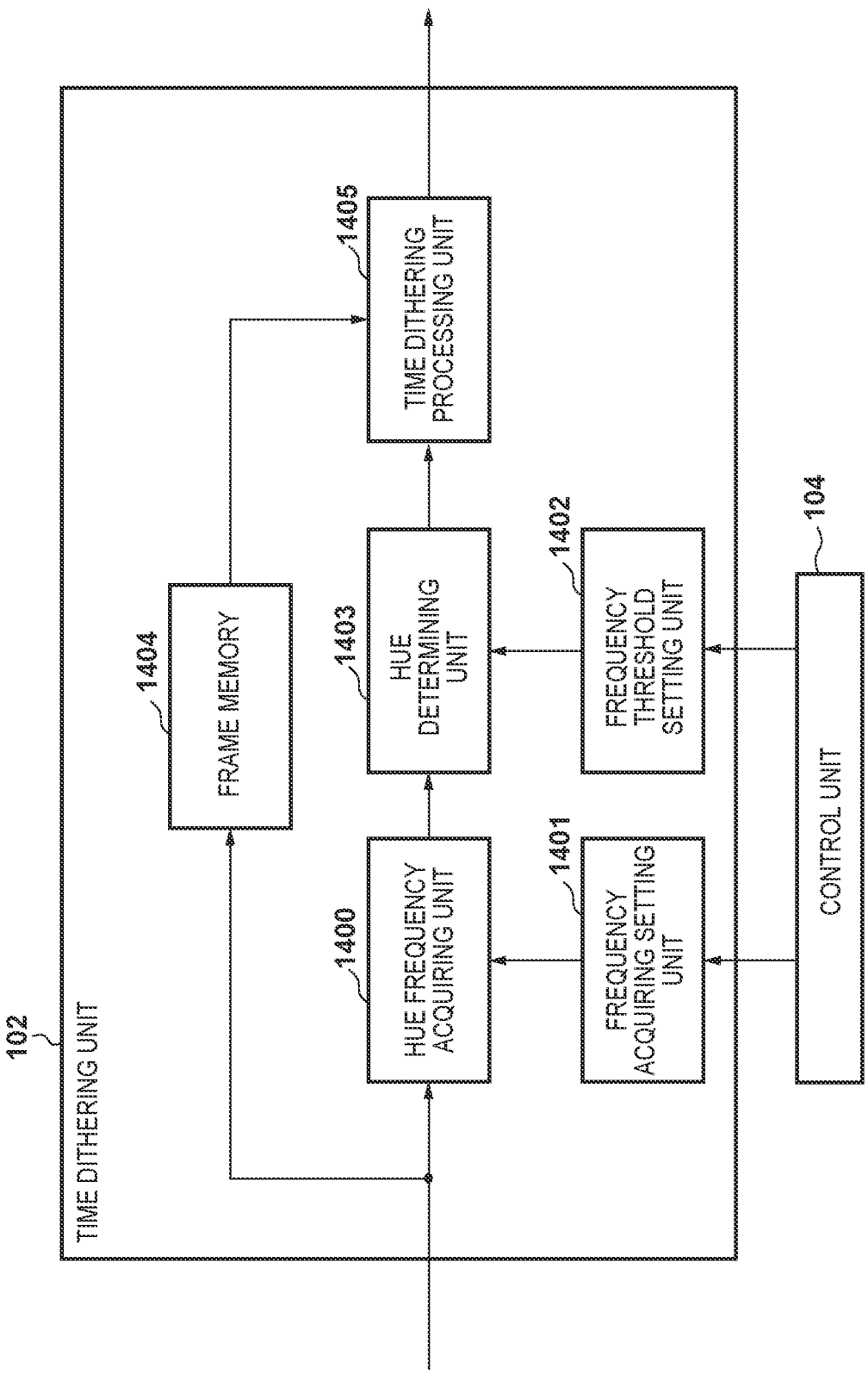
FIG. 14 is a block diagram illustrating a configuration example of a time dithering unit in a fifth embodiment.

FIG. 14 is a block diagram illustrating a configuration example of a time dithering unit 102 in a fifth embodiment. The time dithering unit 102 is configured to include a hue frequency acquiring unit 1400, a frequency acquiring setting unit 1401, a frequency threshold setting unit 1402, a hue determining unit 1403, a frame memory 1404, and a time dithering processing unit 1405.

In the present embodiment, the frame rate of the display apparatus 120 is set to 60 Hz, and frequency information indicating how many pixels including a large amount of green or red components exist in an image for one frame is acquired with respect to 10-bit RGB image data. The dither pattern used for the time dithering process is controlled thereby.

The hue frequency acquiring unit 1400 compares the R, G, and B values for each pixel of the input image data, and counts the green component frequency based on whether green component is large. The red component frequency is counted based on whether red component is large. The frequency of the green or red component is counted (determination results are counted) as frequency information based on the condition set in the frequency acquiring setting unit 1401. In the present embodiment, when the following condition 1 is met, green frequency information is counted as an image including many green components. Also, when the following condition 2 is met, red frequency information is counted as an image including many red components.

$$G>R \text{ and } G>B \quad \text{(Condition 1)}$$

$$R>G \text{ and } R>B \quad \text{(Condition 2)}$$

The input image data is sequentially recorded in the frame memory 1404 until hue frequency information of the image data of one frame is acquired.

When the acquisition of the frequency information of the image data for one frame is completed, the hue determining unit 1403 determines the hue of the input image using the acquired hue frequency information and the threshold set in the frequency threshold setting unit 1402. In the present embodiment, the green frequency threshold=the red frequency threshold=half the number of pixels for one frame.

When the green frequency information is half or more of the number of pixels for one frame, the image data is determined to be an image including a large number of green components. Since artificial contours are easily recognized in an image including a large amount of green components (an image including a large amount of G components), a time dithering pattern that is highly effective at suppressing artificial contours is applied. Specifically, an image for one frame is read out from the frame memory 1404, and the time dithering processing unit 1405 performs a time dithering process in which four frames are handled as one cycle. In this case, the dither frequency is 15 Hz which is calculated by the frame rate 60 Hz/4 frames.

When the red frequency information is half or more of the number of pixels for one frame, the image data is determined to be an image including a large number of red components. In an image containing a large amount of red components (an image containing a large amount of R components), artificial contours are hard to recognize, so that the effect of suppressing the artificial contour is weakened, but a time dithering pattern which is highly effective at suppressing secondary flicker is applied. Specifically, an image for one frame is read out from the frame memory 1404, and the time dithering processing unit 1405 performs a time dithering process in which two frames are handled as one cycle. In this case, the dither frequency is 30 Hz which is calculated by the frame rate 60 Hz/2 frames.

In the present embodiment, by obtaining the hue frequency of the image data for one frame, the dither pattern is switched every one frame, but it may be controlled for each one pixel of the image data. Also, frequency information before one frame or cumulative frequency information before a plurality of frames may be used. In this case, the frame memory 1404 illustrated in FIG. 14 becomes unnecessary.

In addition, the dither pattern used in the time dithering unit 102 may be switched by the user directly designating an image with a large green or red component by a mode setting or the like.

In the above description, the frequency information of the hue is detected by the hue frequency acquiring unit 1400, and the determination was made by the hue determining unit 1403. However, when the hue information corresponding to the pixels is added in advance to the input image data, the dither pattern may be switched by the hue determining unit 1403 using this.

Sixth Embodiment

In the sixth embodiment, a method of switching the time dithering pattern according to the brightness of the input image data will be described.

The configuration of the image display system according to the sixth embodiment is the same as the block diagram of FIG. 1 illustrating the first embodiment. Parts that are the same as those of the image display system according to the first embodiment are denoted by the same reference numerals, and description thereof is omitted.

FIG. 15 is a block diagram illustrating a configuration example of a time dithering unit 102 in the present embodiment. The time dithering unit 102 is configured to include a luminance detection unit 1500, a luminance frequency acquiring unit 1501, a frequency acquiring setting unit 1502, a frequency threshold setting unit 1503, a brightness determining unit 1504, a frame memory 1505, and a time dithering processing unit 1506.

The luminance detection unit 1500 acquires the luminance of the image from the R, G, and B values for each input image data pixel and counts the luminance (brightness) as the luminance frequency if the pixel is bright. Conversion from R, G, and B values to the value Y (assumed to be 10 bits) of the luminance (brightness value) is calculated by (Equation 1).

$$Y=(0.26270\times R)+(0.67800\times G)+(0.05930\times B) \quad \text{(Equation 1)}$$

The luminance frequency is counted based on the condition set in the frequency acquiring setting unit 1502. In the present embodiment, when the Y value calculated by Equation 1 given above meets Condition 3 given below, the luminance frequency information is counted as a bright pixel. In the present embodiment, it is assumed that Y has an accuracy of 10 bits and $0 \leq Y \leq 1023$.

$$Y>512 \quad \text{(Condition 3)}$$

The input image data is sequentially recorded in the frame memory 1505 until luminance frequency information of the image data of one frame is acquired.

When the acquisition of the frequency information of the image data for one frame is completed, the brightness determining unit 1504 determines the brightness of the input image using the acquired luminance frequency information and the threshold set in the frequency threshold setting unit 1503. In the present embodiment, the luminance frequency threshold=half the number of pixels for one frame.

When the luminance frequency information is equal to or more than half the number of pixels of one frame, the brightness determining unit 1504 determines that the image data is a bright image. In a bright image, artificial contours are difficult to recognize, but flicker generated by dither processing tends to be easily recognized. Therefore, although the effect of suppressing the artificial contours is weakened, a time dithering pattern that is highly effective at suppressing secondary flicker is applied. Specifically, an image for one frame is read out from the frame memory 1505, and the time dithering processing unit 1506 performs a time dithering process in which two frames are handled as one cycle. In this case, the dither frequency is 30 Hz which is calculated by the frame rate 60 Hz/2 frames.

When the luminance frequency information is less than half the number of pixels of one frame, the brightness determining unit 1504 determines that the image data is a dark image. In a dark image, artificial contours are easy to recognize, but flicker generated by dither processing tends to be difficult to recognize. Therefore, a time dithering pattern highly effective at suppressing artificial contour is applied. Specifically, an image for one frame is read out from the frame memory 1505, and the time dithering processing unit 1506 performs a time dithering process in which four frames are handled as one cycle. In this case, the dither frequency is 15 Hz which is calculated by the frame rate 60 Hz/4 frames.

In the present embodiment, by obtaining the brightness frequency of the image data for one frame, the dither pattern is switched every one frame, but it may be controlled for each one pixel of the image data. Also, frequency information before one frame or cumulative frequency information before a plurality of frames may be used. In this case, the frame memory 1505 described in FIG. 15 becomes unnecessary.

In addition, the dither pattern used in the time dithering processing unit 1506 may be switched by the user directly designating a bright image or a dark image by a mode setting or the like.

In the above description, the brightness of the image is detected by the luminance detection unit 1500, and the luminance frequency is detected by the luminance frequency acquiring unit 1501. However, when the brightness information corresponding to each pixel or one image frame is added in advance to the inputted image data, switching of the dither pattern used in the time dithering processing unit 1506 may be performed using the brightness information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-004500, filed Jan. 14, 2021, which is hereby incorporated by reference herein in its entirety.

What is claimed is:

1. An image processing apparatus for performing processing that rounds down C bits (C is a positive integer) from an A-bit (A is a positive integer) image, and that causes a B=(A–C) bit image resulting from the rounding down processing to be displayed on a display device at a frame rate of M frames/second (M is a positive real number), the image processing apparatus comprising:
   at least one processor or circuit configured to function as:
   a time dithering unit configured to express a pixel value that is an intermediate value of one step in (A–C) bits in the A-bit image by, in accordance with a ratio in the one step of the intermediate value, selectively outputting in each frame across N frames (N is a positive integer) a value where the intermediate value in the (A–C) bits was rounded down and a value where the intermediate value in the (A–C) bits was rounded up, and to artificially express the A-bit image with a dither pattern where the N frames is a minimum unit,
   wherein the time dithering unit sets the value of N so that M/N is 25 or more.

2. The image processing apparatus according to claim 1, wherein the time dithering unit sets the value of N so that M/N is 30 or more.

3. The image processing apparatus according to claim 1, wherein the at least one processor or circuit is configured to further function as
   an OETF (Optical-Electro Transfer Function) converting unit configured to convert an input image using a predetermined OETF (Optical-Electro Transfer Function), and acquire the A-bit image.

4. The image processing apparatus according to claim 1, wherein the time dithering unit performs a time dithering process according to a value of a predetermined bit of the A-bit image in relation to a start frame of a dither pattern of the N frames, and performs a time dithering process according to a value of a predetermined bit of the start frame in relation to a frame other than the start frame of the N frames.

5. The image processing apparatus according to claim 1, wherein the time dithering unit performs a time dithering process according to a value of a predetermined bit of the A-bit image in relation to each frame of the N frames.

6. The image processing apparatus according to claim 1, wherein the at least one processor or circuit is configured to further function as
   a spatial dithering unit configured to add a value of a pixel that is an intermediate value of one step in the (A–C) bits to an adjacent pixel value.

7. The image processing apparatus according to claim 6, wherein the spatial dithering unit performs a spatial dithering process in accordance with a value of a bit that is not used in a time dithering process in the A-bit image.

8. The image processing apparatus according to claim 6, wherein the spatial dithering unit performs a spatial dithering process if a bit width A–B–(N/2)–1, for which a most significant bit is A–B–(N/2)–1 and a least significant bit is 0, is 0 or more.

9. The image processing apparatus according to claim 1, wherein the time dithering unit performs a time dithering process in relation to a range of a bit width whose most significant bit is A–B–1 and whose least significant bit is A–B–(N/2).

10. The image processing apparatus according to claim 3, wherein the time dithering unit sets the value of N so that M/N is 25 or more in a case where a bit width of an image that the OETF converting unit outputted is larger than a bit width of an external data transmission line.

11. The image processing apparatus according to claim 1, wherein
   the time dithering unit comprises a hue frequency acquiring unit configured to count a frequency in a case where a green component of an inputted image is greater than a red component; a frequency acquiring setting unit configured to designate a condition for the counting of the frequency by the hue frequency acquiring unit; and a hue determining unit configured to determine a hue of an image in accordance with a frequency acquired by the hue frequency acquiring unit, wherein
   a dither pattern to use is set in accordance with a determination result of the hue determining unit.

12. The image processing apparatus according to claim 1, wherein
   the time dithering unit comprises a luminance detecting unit configured to detect a luminance value from an inputted image; a luminance frequency acquiring unit configured to count a frequency from the luminance value detected by the luminance detecting unit; a frequency acquiring setting unit configured to designate a range of luminance values to count by the luminance frequency acquiring unit; and a brightness determining unit configured to determine a brightness of image data in accordance with a frequency obtained by the luminance frequency acquiring unit, wherein
   in accordance with a determination result of the brightness determining unit, a dither pattern to use is set.

13. An image display system, comprising:
   the image processing apparatus according to claim 1;
   a display apparatus configured to display an image; and
   an external data transmission line configured to transmit an image from the image processing apparatus to the display apparatus, wherein
   the display apparatus comprises an EOTF (Electro-Optical Transfer Function) converting unit configured to convert an image acquired through the external data transmission line using an EOTF which has a reverse characteristic to an OETF (Optical-Electro Transfer Function) used in an OETF converting unit that the image processing apparatus comprises.

14. An image display system, comprising:

the image processing apparatus according to claim 1;

a display apparatus configured to display an image; and an external data transmission line configured to transmit an image from the image processing apparatus to the display apparatus, wherein the image processing apparatus comprises a light emission characteristic inverse converting unit configured to perform an inverse conversion of a light emitting characteristic based on a display configuration of the display apparatus in relation to an image acquired by an OETF (Optical-Electro Transfer Function) converting unit, and the display apparatus comprises a light emission characteristic converting unit configured to perform a conversion of a light emitting characteristic based on a display configuration of the display apparatus in relation to an image acquired from the external data transmission line.

15. The image display system according to claim 13, configured to use MIPI (Mobile Industry Processor Interface), LVDS (Low Voltage Differential Signaling), HDMI (High-Definition Multimedia Interface), Display Port, or SDI (Serial Digital Interface) as the external data transmission line.

16. An image processing method for performing processing that rounds down C bits (C is a positive integer) from an A-bit (A is a positive integer) image, and that causes a B=(A−C) bit image resulting from the rounding down processing to be displayed on a display device at a frame rate of M frames/second (M is a positive real number), the method comprising:

performing a time dithering process that expresses a pixel value that is an intermediate value of one step in (A−C) bits in the A-bit image by, in accordance with a ratio in the one step of the intermediate value, selectively outputting in each frame across N frames (N is a positive integer) a value where the intermediate value in the (A−C) bits was rounded down and a value where the intermediate value in the (A−C) bits was rounded up, and artificially expresses the A-bit image with a dither pattern where the N frames is a minimum unit, wherein the value of N is set in the time dithering process so that M/N is 25 or more.

17. A non-transitory computer-readable storage medium storing a program for causing a computer to execute the steps of an image processing method for performing processing that rounds down C bits (C is a positive integer) from an A-bit (A is a positive integer) image, and that causes a B=(A−C) bit image resulting from the rounding down processing to be displayed on a display device at a frame rate of M frames/second (M is a positive real number), the method comprising:

performing a time dithering process that expresses a pixel value that is an intermediate value of one step in (A−C) bits in the A-bit image by, in accordance with a ratio in the one step of the intermediate value, selectively outputting in each frame across N frames (N is a positive integer) a value where the intermediate value in the (A−C) bits was rounded down and a value where the intermediate value in the (A−C) bits was rounded up, and artificially expresses the A-bit image with a dither pattern where the N frames is a minimum unit, wherein the value of N is set in the time dithering process so that M/N is 25 or more.

\* \* \* \* \*